(12) United States Patent
Sasaki

(10) Patent No.: US 6,957,207 B2
(45) Date of Patent: Oct. 18, 2005

(54) USER INFORMATION INFERRING SYSTEM

(75) Inventor: Mikio Sasaki, Kariya (JP)

(73) Assignee: Denso Corporation, Kariya (JP)

( * ) Notice: Subject to any disclaimer, the term of this patent is extended or adjusted under 35 U.S.C. 154(b) by 337 days.

(21) Appl. No.: 09/954,300

(22) Filed: Sep. 18, 2001

(65) Prior Publication Data

US 2002/0065836 A1 May 30, 2002

(30) Foreign Application Priority Data

Sep. 20, 2000 (JP) ........................................ 2000-285521

(51) Int. Cl.[7] .............................................. G06N 5/02
(52) U.S. Cl. .............................. 706/47; 706/46; 706/12
(58) Field of Search .............................. 706/47, 46, 12; 701/3

(56) References Cited

U.S. PATENT DOCUMENTS

| | | | | |
|---|---|---|---|---|
| 5,523,759 A | * | 6/1996 | Gillberg et al. | 342/26 |
| 5,546,578 A | | 8/1996 | Takada | |
| 5,577,247 A | | 11/1996 | Uyama et al. | |
| 5,696,964 A | | 12/1997 | Cox et al. | |
| 5,722,405 A | * | 3/1998 | Goldberg | 600/407 |
| 5,781,704 A | * | 7/1998 | Rossmo | 706/45 |
| 5,803,914 A | * | 9/1998 | Ryals et al. | 600/407 |
| 6,519,571 B1 | * | 2/2003 | Guheen et al. | 705/14 |
| 2001/0044680 A1 | * | 11/2001 | Lemelson et al. | 701/3 |

FOREIGN PATENT DOCUMENTS

| | | |
|---|---|---|
| EP | 0982675 | 1/2000 |
| JP | B2-6-43919 | 7/1990 |
| JP | A-5-46398 | 2/1993 |
| JP | A-5-118612 | 5/1993 |
| JP | A-5-118613 | 5/1993 |
| JP | A-6-149892 | 5/1994 |
| JP | A-6-348493 | 12/1994 |
| JP | A-8-77105 | 3/1996 |
| JP | A-8-153002 | 6/1996 |
| JP | A-8-292864 | 11/1996 |
| JP | A-10-187565 | 7/1998 |
| JP | A-10-228482 | 8/1998 |
| JP | A-11-25122 | 1/1999 |
| JP | A-11-351901 | 12/1999 |
| JP | A-2000-20090 | 1/2000 |
| JP | A-2000-76223 | 3/2000 |

OTHER PUBLICATIONS

U.S. Appl. No. 09/897,138, Sasaki et al., filed Jul. 3, 2001.

* cited by examiner

Primary Examiner—Anthony Knight
Assistant Examiner—Joseph Hirl
(74) Attorney, Agent, or Firm—Posz Law Group, PLC

(57) ABSTRACT

A user information inferring system defines user information according to five categories, that is, user environment, circumstance, condition, request, and action, and further defines a sixth category, that is, situation data encompassing these other five categories. User information in each of the defined categories, that is, environment, circumstance, condition, request, action, and situation, is then described using item values, and operating units infer the item values. The inference operation uses temporal-spatial characteristics indicative of the effect of temporal-spatial elements on the item values, information about inferred situations, a rule database containing rules describing the relationships between items, and an optimization process for the defined categories using vector expressions.

64 Claims, 21 Drawing Sheets

USER INFORMATION INFERRING SYSTEM

CROSS REFERENCE TO RELATED APPLICATION

This application is based on and incorporates herein by reference Japanese Patent Application No. 2000-285521 filed on Sep. 20, 2000.

BACKGROUND OF THE INVENTION

The present invention relates to technology for inferring or estimating user information for controlling equipment in a motor vehicle with minimal user input.

Controlling numerous devices and products from a central location has become a common part of everyday life as a result of advances in computer systems. This includes automobiles and other motor vehicles where audio equipment, telephones and other communications devices, display devices, air conditioning systems, and lighting equipment can be controlled from a driver's seat. It is even possible for the driver to use an on-board navigation system to obtain route assistance, and more recently to search for hotels and other facilities via the Internet.

This type of central control capability should provide comprehensive control of equipment operations for a convenient, user-friendly environment. In reality, however, these systems are not always particularly convenient from the user's perspective. This is because the man-machine interface often makes it difficult for the user to input user commands to the system, and the user is therefore unable to operate the equipment as desired.

For example, while voice recognition technology enables the user to control equipment by voiced instructions, this requires the user to speak particular command words to the system each time particular equipment is operated. This becomes increasingly complicated as the number of controllable devices and functions increases, because the user must accurately enunciate a larger number of words. This also means that the voice recognition system must be able to accurately recognize a wide range of user-spoken words in order to control the equipment as instructed by the user.

To resolve this problem, it is proposed to operate equipment semi-automatically as disclosed in JP-11-351901A and JP-2000-20090A. JP-11-351901A teaches to search a database of operating content settings for system operating content based on input content, individual data, and detected conditions to operate the equipment. JP-2000-20090A teaches to infer a request based on user circumstance and conditions. These technologies are able to operate equipment according to the user's intent using less spoken input from the user.

The user information, however, is recorded as a profile in the above JP documents and has several interrelated levels of information descriptive of, for example, the user's surrounding environment and conditions, the user's current situation and requests, and the user's actions. In JP 2000-20090A, for example, the user's future situation is predicted from the user's request, and the user's next request is inferred from the user's situation.

If the user's true intention is to be considered, there will clearly be cases in which the user's request cannot be sufficiently inferred from the user situation that is sensed by the system. That is, there is a need for the system to more specifically and more accurately detect such user information as the user's environment, condition, situation, request, and actions in order to more appropriately operate the equipment.

SUMMARY OF THE INVENTION

A first object of the present invention is therefore to improve the above technology to more specifically infer, in addition to the user's request, such user information as the user's environment, condition, situation, and actions.

A second object of the present invention is to more accurately sense this user information and thereby help achieve appropriate equipment operation with less user input.

According to one aspect of the present invention, a user information inferring system infers user information as item values, a part of which in each data set changes in conjunction with temporal-spatial elements. The inferring system calculates one of a temporal characteristics that a temporal element imparts to the item value and a spatial characteristics that a spatial element imparts to the item value. The item value is inferred based on the calculated one of the characteristics.

According to another aspect of the present invention, a user information inferring system infers user information as an item value in at least one of data set by categorically defining the user information as at least one of data set and expressing the data set with an item written in a data list corresponding to the data set. The inferring system has a rule database storing rules correlating items written in the data list for the data set, and infers the item value based on the rules recorded in the rule database.

According to a further aspect of the present invention, a user information inferring system infers user information as an item value in at least one data set by categorically defining the user information as at least one data set and expressing the data set with an item written in a data list corresponding to the data set. The data set is expressed by a data vector for each data set using the item value as a component. The inferring system calculates a distance between the data vector and a reference vector indicating an optimum condition for the data set, and infers the item value to optimize the data set based on the distance calculated by the distance calculating means.

According to a still further aspect of the present invention, a user input inferring system infers user information as an item value in at least one data set by categorically defining the user information as at least one data set and expressing the data set with an item written in a data list corresponding to the data set. Each data set includes a situation data set indicating a user situation. The inferring system infers an item value of the situation data set based on item values of other data sets.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
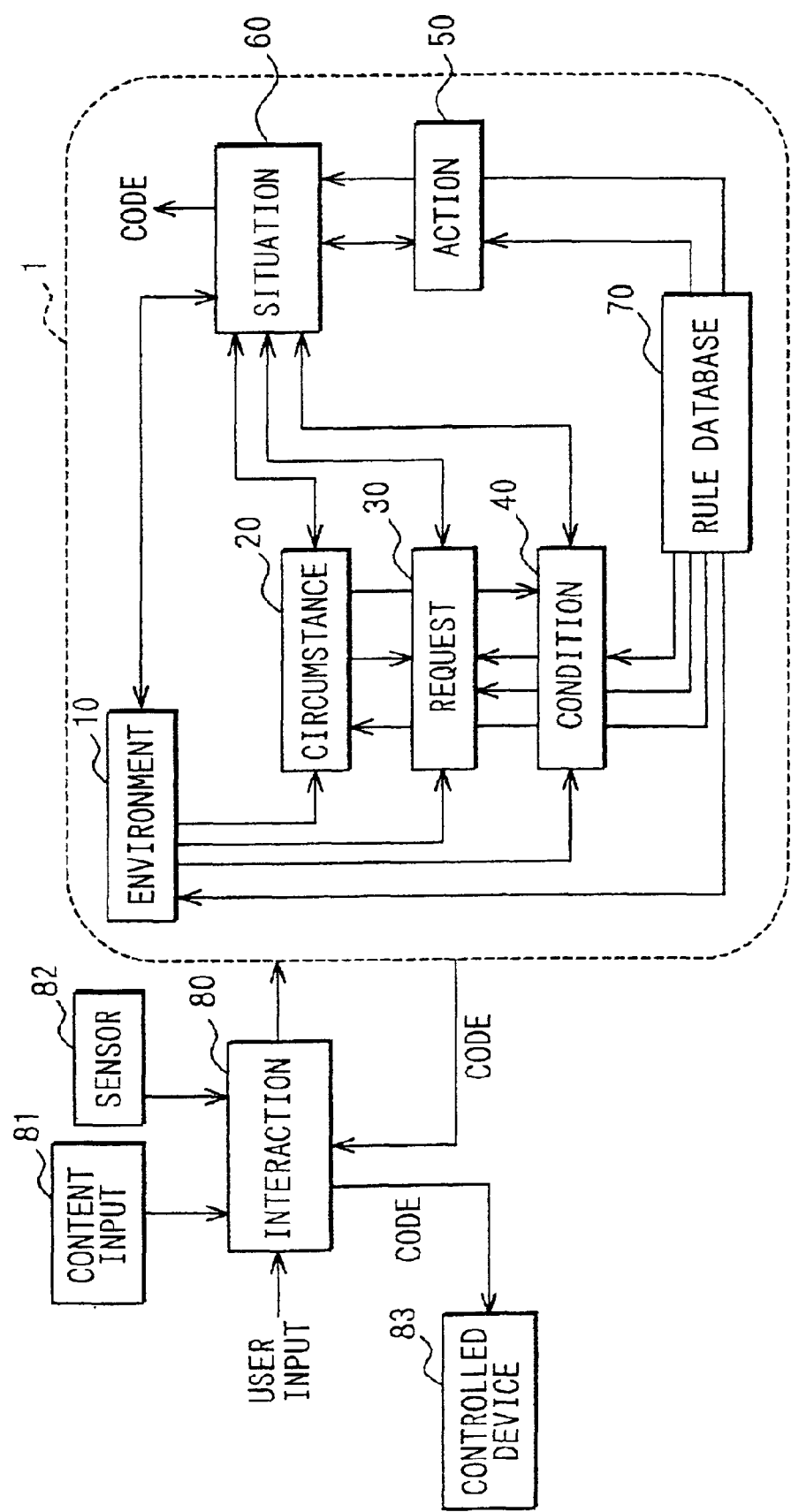
FIG. 1 shows an interactive system including a user information inferring system according to a preferred embodiment of the invention.

Referring first to FIG. 1, an interactive system includes a user information inferring system 1 and various equipment provided on board a motor vehicle, and semi-automatically controls the equipment appropriately to match with user feeling.

In addition to the user information inferring system 1, this interactive system has an interaction device 80, content input device 81, sensor 82 and at least one controlled device 83.

The interaction device 80 has a voice recognition capability, enabling a user to input information and commands to the interaction device 80 by speaking to the interaction device 80. The content input device 81 inputs content data such as the weather and traffic congestion information to the interaction device 80. The sensor 82 inputs sensing data relating to, for example, different parts of the vehicle, the outside temperature, and noise.

The interaction device 80 stores these information in the form of a profile, which it outputs to the user information inferring system 1. The user information inferring system 1 then infers the current situation as determined by the present user environment and circumstance, and the user's condition, requests, and actions, and outputs this information as the user information to the interaction device 80. The interaction device 80 then outputs the user's request and condition, and commands and search text, for example, determined by the user's request and condition to the controlled device 83.

The controlled device 83 could be, for example, a navigation system, audio equipment, television receiver, search device, telephone, window control unit, or various other on-board devices. The controlled device 83 could also be a control device for controlling all on-board equipment. That is, the user information inferring system 1 infers appropriate user information to semi-automatically appropriately operate on-board vehicle equipment. More specifically, the application program (application) of the controlled device 83 runs semi-automatically.

The user information inferring system 1 is a computer system, and includes a CPU, ROM, RAM, I/O interface, bus connecting these, a hard disk drive or other storage device, and a communications device enabling communication with the interaction device 80. FIG. 1 shows the functional configuration of the user information inferring system 1. The user information inferring system 1 comprises an environment calculator 10, circumstance calculator 20, request calculator 30, condition calculator 40, action calculator 50, situation calculator 60, and a rule database 70.

The user information inferring system 1 separates the user information into a total of six user information categories, including five specific categories, that is, the user environment, circumstance, condition, request, and action, and one general category, referred to as the situation, that can be described by these five user information categories. The calculators 10 to 60 infer the respective user information using the rule database 70, while the user environment, circumstance, condition, request, and action calculators 10 to 50 also use the results from the situation calculator 60 for the respective inference operations. Each of the calculators 10 to 60 also use the calculated results from other specific calculators 10 to 60 for their respective inference operations. It will thus be understood that the above six defined categories are mutually related.

Detailed items are defined in a list format for each of the above defined categories, and the user information is expressed using item values for each defined category, that is, for each user environment, circumstance, condition, request, action, and situation data set. The calculators 10 to 60 estimate a value for each of the items in the respective lists to infer the item values for each data set.

A list is defined for each of the calculators 10 to 60, and each list has a four level hierarchical structure. The lists are therefore defined next below.

(1) Lists (1-1) Environment Lists

The environment list store items typically used to express the environment surrounding the user. These items enable the system to construct a model of the environment surrounding the user.

1. Complete Environment List (Environment Dictionary)

This list is a dictionary of natural language expressions that are descriptive of the user environment and expected by the application to be voiced by the user. This list contains all items associated with the user environment category. This list includes the items described in JP-A-11-351901 and JP-A-2000-20090.

2. Typical Environment List

Typical environment refers to a relatively small number of environments that are both typical and have a high frequency of occurrence when a user makes a request. Examples include approaching the user's home, highway conditions, snow, the coast during summer, around Nagoya train station, and an airport parking lot.

3. User Environment List

This list stores descriptive words for an environment typical of a particular situation or used frequently by a particular user.

4. Active Environment List

This list stores descriptive words for the environment most important at the current time.

(1-2) Circumstance Lists

The circumstance lists store items typically used to express the current user circumstance.

1. Complete Circumstance List (Circumstance Dictionary)

This list is a dictionary of natural language expressions that are descriptive of the user circumstance and expected by the application to be voiced by the user. Typical terms include the following: traffic jam; on the way to work; on a trip; shopping; leisure time; driving for a long time.

The items stored in the circumstance list share the following features. That is, the items are descriptive of the current macro activity, and enable plural circumstance to be selected insofar as they are not logically contradictory. Plural circumstance refers, for example, to a "traffic jam" while "on the way to work." The circumstance included in this list include expressions ranging from those indicative of macro activities, such as "on a trip," to minor activities, such as a "traffic jam" encountered on the trip, and even more minor circumstance such as "I don't understand how to use the navigation system" relating to navigation system use when in a traffic jam. These circumstance can also be graded into different levels according to how long a particular circumstance lasts and the spatial area to which the circumstance applies.

2. Typical Circumstance List

Typical circumstance refer to a relatively small number of circumstance that are both typical and have a high frequency of occurrence when a user makes a request. Examples include "a major traffic jam during the Golden Week holiday," "a long line of cars into the event parking lot," and "waiting for a signal during a morning traffic jam."

3. User Circumstance List

This list stores descriptive words for a circumstance typical of a particular situation or one in which the user is frequently found.

4. Active Circumstance List

This list stores descriptive words for the circumstance most important at the current time.

(1-3) Request Lists

The request lists store items typically used to express requests from the user. These items include items applicable to requests in the present, past, future, and in virtual space.

1. Complete Request List (Request Dictionary)

This list is a dictionary of natural language expressions that are descriptive of user requests and expected by the application to be voiced by the user. Typical terms include the following: "I want to go shopping," "what events are scheduled," "I want to attend an event," "I want to go on a trip," "I want something to eat," and "I want to go somewhere."

2. Typical Request List

Typical requests refer to a relatively small number of requests that are both typical and have a high frequency of occurrence when a user makes a request.

3. User Request List

This list stores descriptive words for a request typical of a particular situation or used frequently by a particular user.

4. Active Request List

This list stores descriptive words for the requests most important at the current time.

(1-4) Condition Lists

The condition lists store items typically used to express user conditions.

1. Complete Condition List (Conditions Dictionary)

This list is a dictionary of natural language expressions that are descriptive of user conditions and expected by the application to be voiced by the user. Typical terms include the following: "I'm hungry," "it's hot," "I'm irritated," "I feel good," "I'm depressed," "I'm tired."

2. Typical Condition List

Typical conditions refer to the relatively small number of items defined as a user condition that are typical or have a high frequency of occurrence.

3. User Condition List

This list stores descriptive words for a condition typical of a particular situation or used frequently by a particular user.

4. Active Condition List

This list stores descriptive words for the conditions most important at the current time.

(1-5) Action List

The action list stores items typically used to express user actions. These items include terms applicable to actions in the present, past, future, and in virtual spaces.

1. Complete Action List (Action Dictionary)

This list is a dictionary of natural language expressions that are descriptive of user actions and expected by the application to be voiced by the user. Typical terms include the following: "make a phone call," "listen to a CD," "watch TV," "eat," and "drive."

2. Typical Action List

Typical actions refer to a relatively small number of items defined as a user action that are both typical and have a high frequency of occurrence when a user makes a request.

3. User Action List

This list stores descriptive words for actions typical of a particular situation or frequently engaged in by a particular user.

4. Active Action List

This list stores descriptive words for the actions most important at the current time.

(1-6) Situations Lists

Specific items are defined for the user information categories, that is, user environment, circumstance, conditions, requests, and actions to write typical expressions as described above. It is therefore possible to define typical user situations by defining situations using specific items from these five categories (user environment, circumstance, condition, request, and actions). Items typical of these situations are, for example, "I'm tired of shopping," "I'm tired of travelling," "I don't how to get to the sales appointment," and "I don't know how to get to my destination at the end of the trip." As will be known from these examples, that above five items are not all necessarily used for determining a particular situation.

1. Complete Situations List (Situations Dictionary)

This list is a dictionary of natural language expressions that are descriptive of various user situations and expected by the application to be voiced by the user.

2. Typical Situations List

Typical situations refer to a relatively small number of items defined as a user situation that are both typical and have a high frequency of occurrence.

3. User Situations List

This list stores descriptive words for typical situations with a high frequency of occurrence with a particular user.

4. Active Situation List

This list stores descriptive words for situations of the greatest importance at the present time.

(2) The lists described above are prepared for each of the respective calculators 10 to 60. The configurations of these calculators 10 to 60 are shown in FIG. 2 to FIG. 7.

(2-1) Environment Calculator 10

Figure 2:
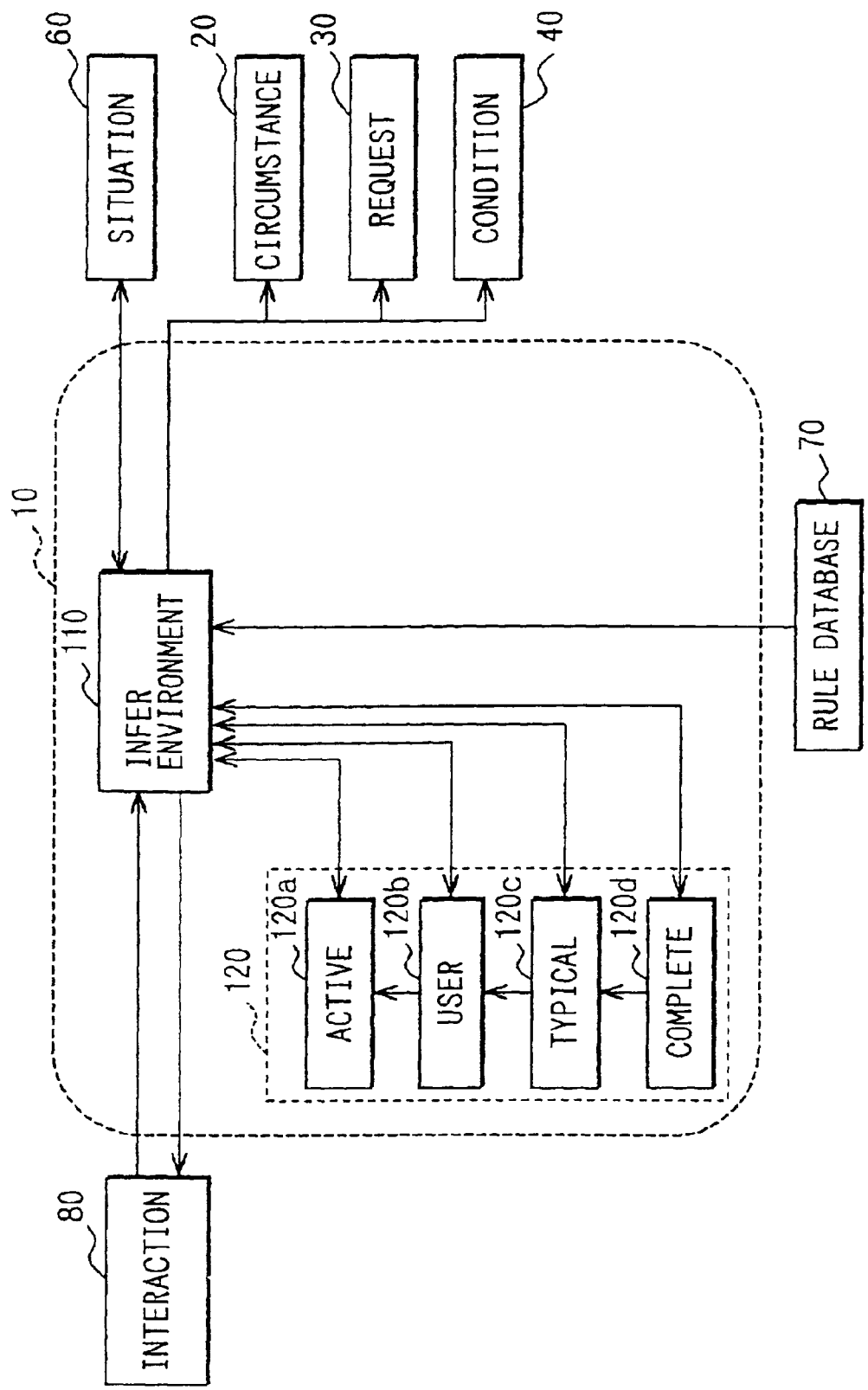
FIG. 2 shows an environment inferring unit in the embodiment.

As shown in FIG. 2, the environment calculator 10 has an environment inferring unit 110 for calculating the inference, and the environment list 120. The environment list 120 include the active environment list 120a, user environment list 120b, typical environment list 120c, and complete environment list 120d in a hierarchical structure.

Using the situations information received from the interaction device 80 and situation calculator 60, the environment inferring unit 110 references the rule database 70 and makes a preferential inference based on the environment items described in the environment list 120 with particular weight given to the environment items in the active environment list 120a. The environment inferring unit 110 then outputs the inference to the situation calculator 60, circumstance calculator 20, request calculator 30, condition calculator 40, and interaction device 80.

The environment inferring unit 110 may also rearrange the items contained in the four individual environment lists 120a to 120d within the respective lists, and may also add items to the lists, based on this inference.

(2-2) Circumstance Calculator 20

Figure 3:
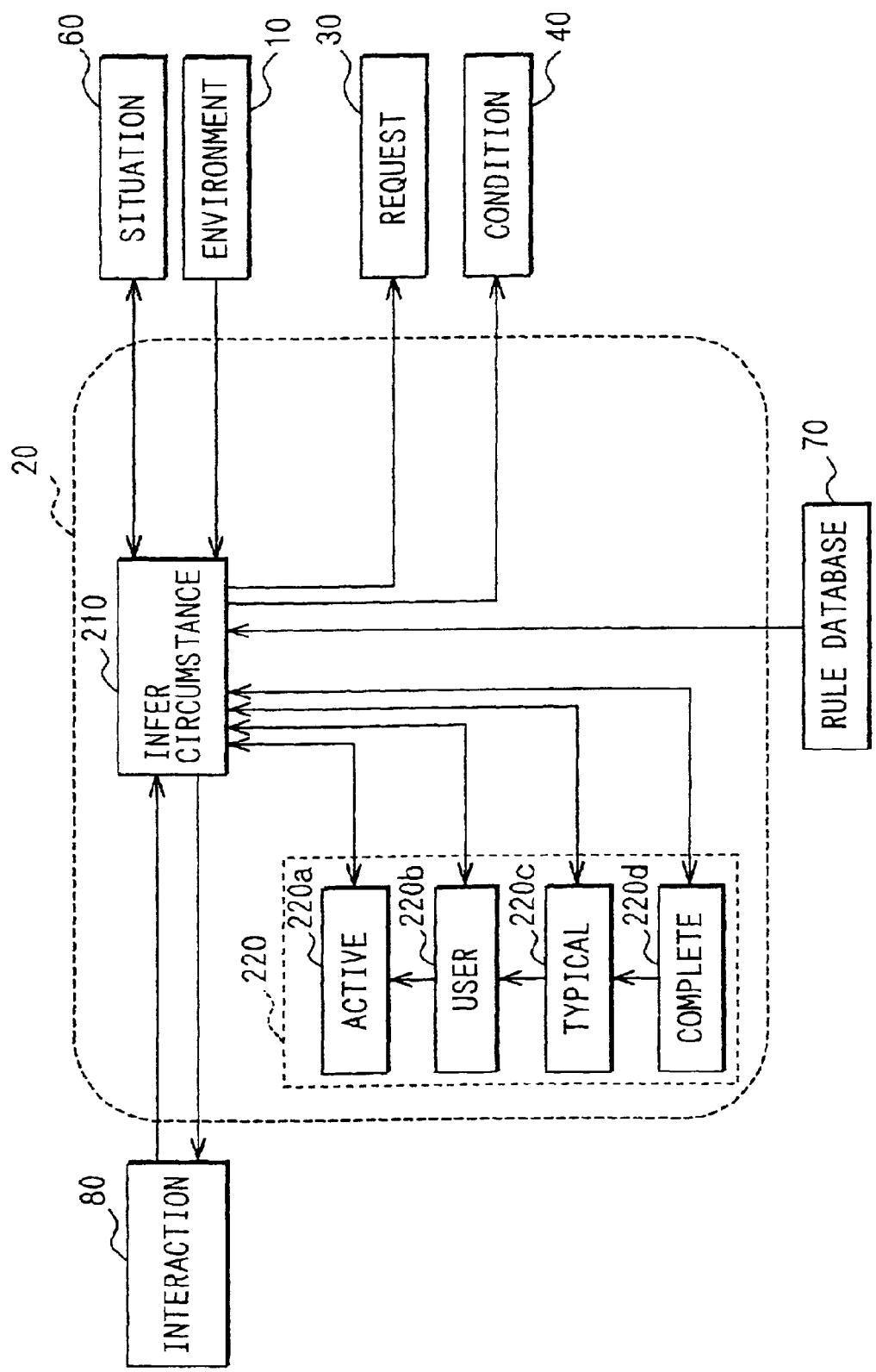
FIG. 3 shows a circumstance inferring unit in the embodiment.

As shown in FIG. 3, the circumstance calculator 20 has a circumstance inferring unit 210 for calculating the inference, and the circumstance list 220. The circumstance list 220 includes the active circumstance list 220a, user circumstance list 220b, typical circumstance list 220c, and complete circumstance list 220d in a hierarchical structure.

Using the information input from the interaction device 80, situation calculator 60, and environment calculator 10, the circumstance inferring unit 210 references the rule database 70 and makes a preferential inference based on the circumstance items described in the circumstance list 220 with particular weight given to the circumstance items in the active circumstance list 220a. The circumstance inferring unit 210 then outputs the inference to the situation calculator 60, request calculator 30, conditions calculator 40, and interaction device 80.

The circumstance inferring unit 210 may also rearrange the items contained in the four individual circumstance lists 220a to 220d within the respective lists, and may also add items to the lists, based on this inference.

(2-3) Request Calculator 30

Figure 4:
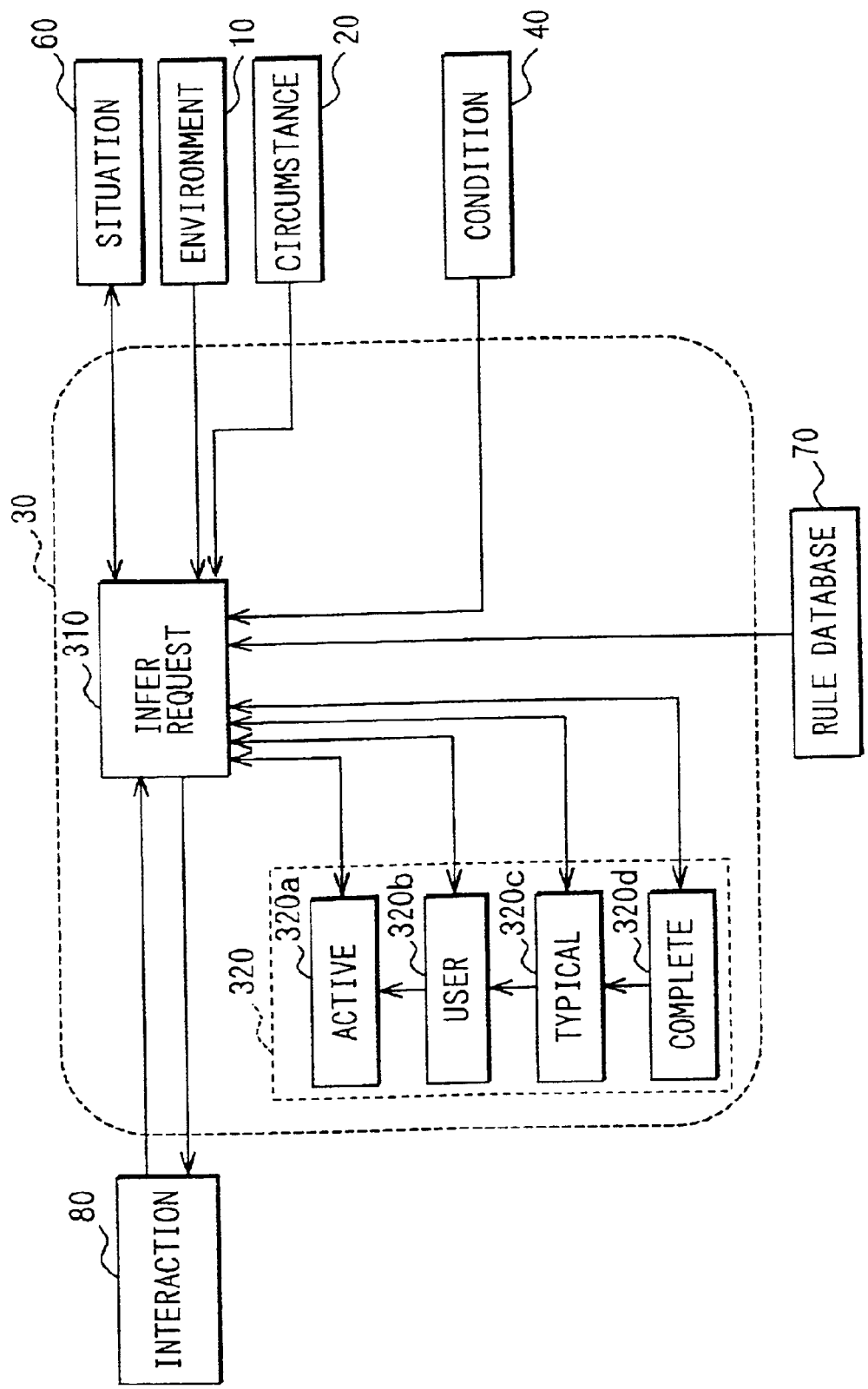
FIG. 4 shows a request inferring unit in the embodiment.

As shown in FIG. 4, the request calculator 30 has a request inferring unit 310 for calculating the inference, and the request list 320. The request list 320 includes the active request list 320a, user request list 320b, typical request list 320c, and complete request list 320d in a hierarchical structure.

Using the information input from the interaction device 80, situation calculator 60, environment calculator 10, circumstance calculator 20, and condition calculator 40, the request inferring unit 310 references the rule database 70 and makes a preferential estimate based on the request items described in the request list 320 with particular weight given to the request items in the active request list 320a. The inference is then output to the situation calculator 60 and interaction device 80.

The request inferring unit 310 may also rearrange the items contained in the four individual request lists 320a to 320d within the respective lists, and may also add items to the lists, based on this estimate.

(2-4) Condition Calculator 40

Figure 5:
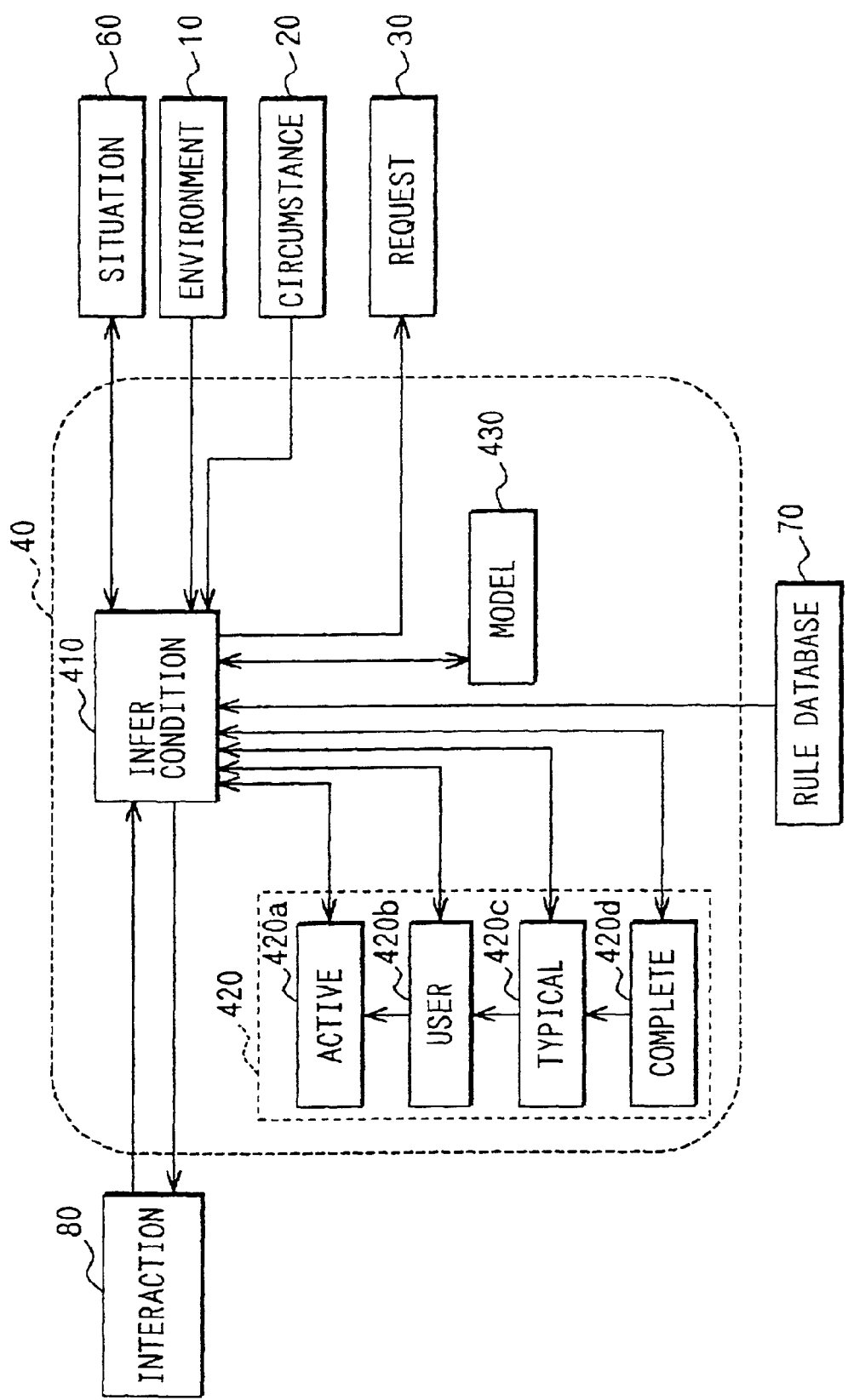
FIG. 5 shows a condition inferring unit in the embodiment.

As shown in FIG. 5, the condition calculator 40 has a condition inferring unit 410 for calculating the inference, a condition list 420, and a conditions model 430. The condition list 420 include the active condition list 420a, user condition list 420b, typical condition list 420c, and complete condition list 420d in a hierarchical structure.

The condition model 430 contains values for the conditions items written in a specific format. This conditions model 430 is described further below.

Using information input from the interaction device 80, situation calculator 60, environment calculator 10, and circumstance calculator 20, the condition inferring unit 410 references the rule database 70 and makes a preferential inference based on the conditions described in the condition list 420 with particular weight given to the request items in the active condition list 420a. The resulting inference is then output to the situation calculator 60, request calculator 30, and interaction device 80.

The condition inferring unit 410 may also rearrange the items contained in the four individual condition list 420a to 420d within the respective lists, and may also add items to the lists, based on this inference.

(2-5) Action Calculator

Figure 6:
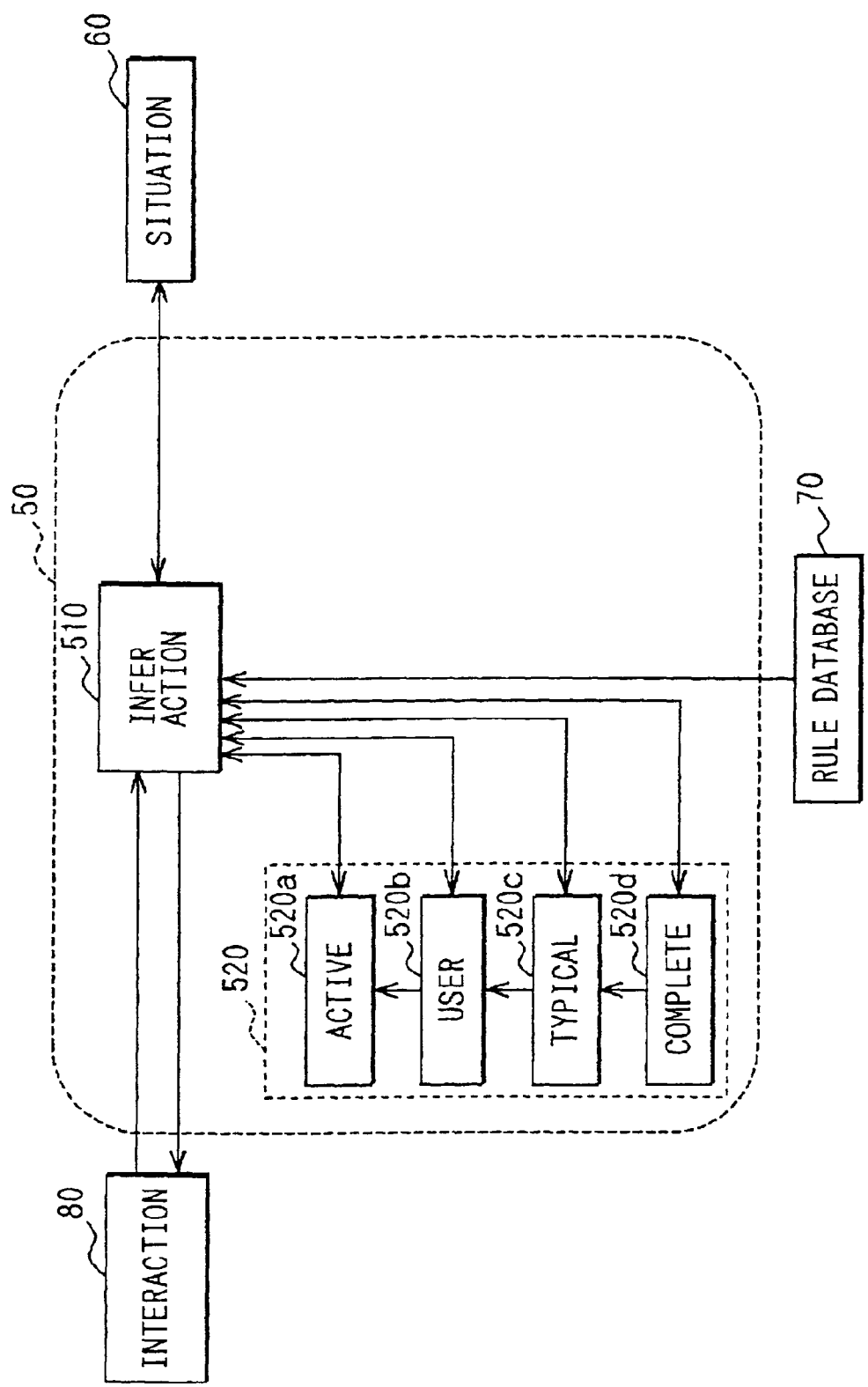
FIG. 6 shows an action inferring unit in the embodiment.

As shown in FIG. 6, the action calculator 50 has an action inferring unit 510 for calculating the inference, and the action list 520. The action list 520 includes an active action list 520a, user action list 520b, typical action list 520c, and complete action list 520d in a hierarchical structure.

Using information input from the interaction device 80 and situation calculator 60, the action inferring unit 510 references the rule database 70 and makes a preferential inference based on the action items described in the action list 520 with particular weight given to the action items in the active action list 520a. The inference is then output to the situation calculator 60 and interaction device 80.

The action inferring unit 510 may also rearrange the items contained in the four individual action lists 520a to 520d within the respective lists, and may also add items to the lists, based on this inference.

(2-6) Situation Calculator 60

Figure 7:
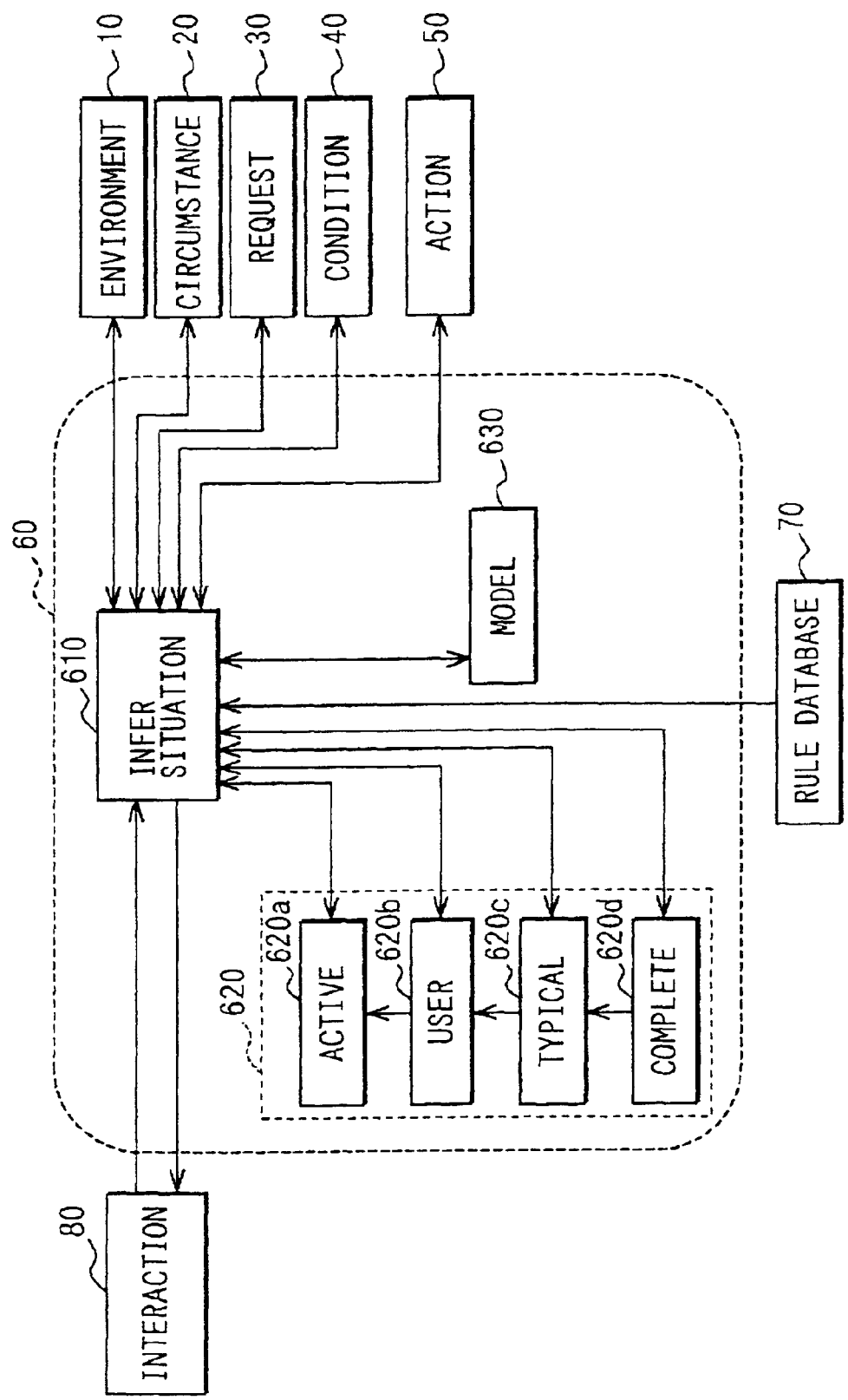
FIG. 7 shows a situation inferring unit in the embodiment.

As shown in FIG. 7, the situation calculator 60 has a situation inferring unit 610 for calculating the inference, a situation list 620, and a situation model 630. The situation list 620 includes an active situation list 620a, user situation list 620b, typical situation list 620c, and complete situation list 620d in a hierarchical structure.

Using information input from the interaction device 80, environment calculator 10, circumstance calculator 20, request calculator 30, condition calculator 40, and action calculator 50, the situation inferring unit 610 references the rule database 70 and makes a preferential inference based on the situation items described in the situation list 620 with particular weight given to the situation items in the active situation list 620a. The resulting inference is then output to the situation calculator 60, environment calculator 10, circumstance calculator 20, request calculator 30, condition calculator 40, action calculator 50, and interaction device 80.

The situation inferring unit 610 may also rearrange the items contained in the four individual situation lists 620a to 620d within the respective lists, and may also add items to the lists, based on this inference.

(3) The configuration and operation of the Inferring units 110, 210, 310, 410, 510, and 610 of the above calculators 10 to 60 are described next below.

(3-1) Environment Inferring Unit 110

Figure 8:
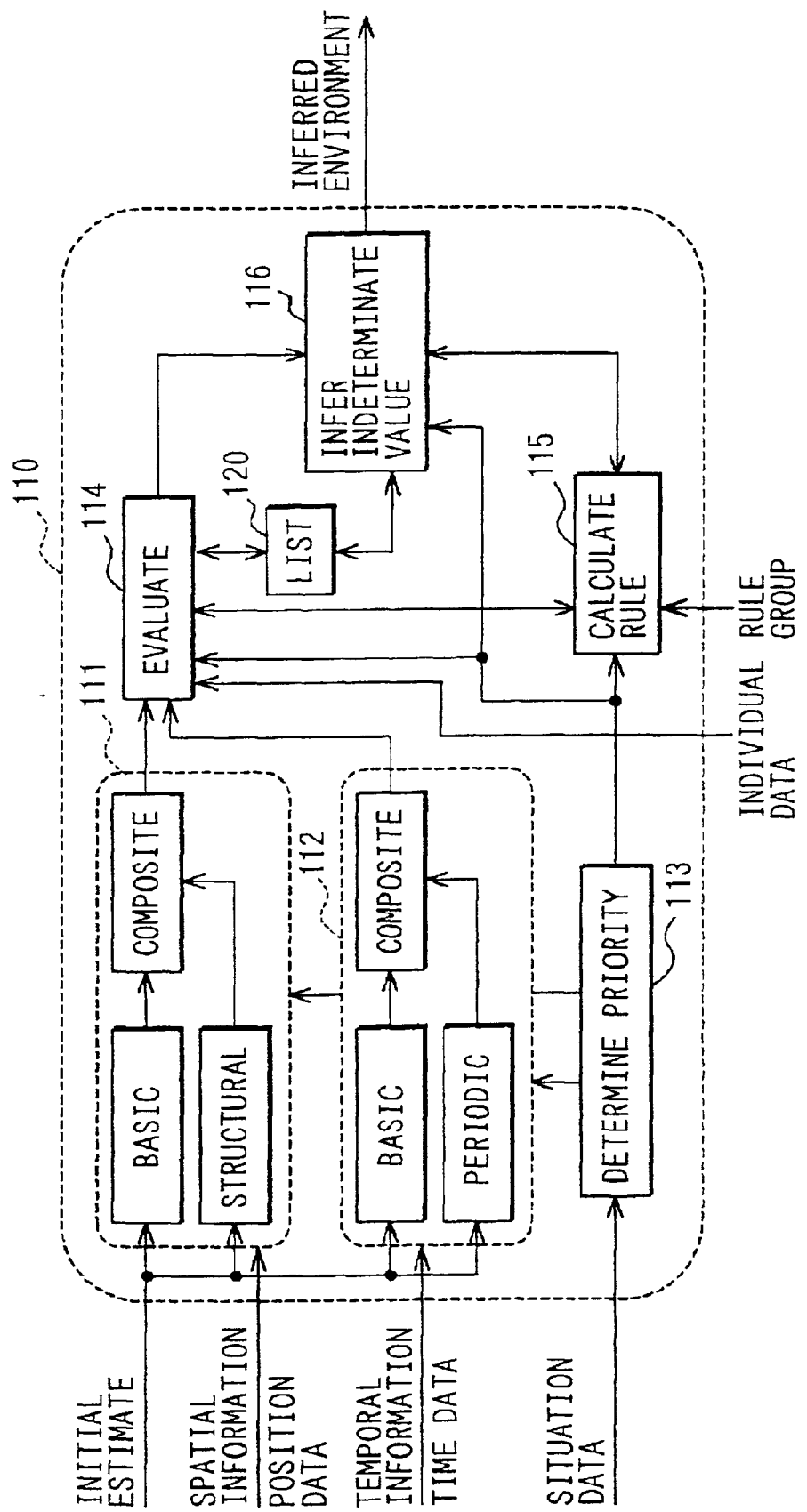
FIG. 8 shows functions of the environment inferring unit.

FIG. 8 is a function block diagram used to describe the operation of the environment inferring unit 110. A spatial characteristics calculation block 111 and a temporal characteristics calculation block 112 shown in the figure respectively calculate spatial characteristics and temporal characteristics.

It should be noted that other inferring units 210 to 610 similarly calculate spatial characteristics and temporal characteristics. A feature of the present embodiment is this calculation of the spatial characteristics and temporal characteristics, and how time and space are handled in this embodiment as part of the environment surrounding the user is therefore also described below.

The time and space (together referred to as "events") are aspects of the user environment. It will also be obvious that the time and space aspects of the user environment affect other aspects of the user environment and have a significant effect on the users circumstance, condition, requests, actions, and situation.

It is therefore not particularly meaningful to express time and space as simple physical quantities. For example, using the time returned by a system clock in the form 00:00, or using a location reference (such as map coordinates) returned by a GPS receiver, is not particularly meaningful.

More specifically, time is typically perceived in the world in which people live as a period, such as one day, one week, one month, one year, or one century, within which activities and events occur, and other expressions, such as the season or part of the day, are important typical expressions of time. More appropriate, meaningful inferences can therefore be achieved by incorporating time references such as these in the lists of items describing the environment. Spatial references are also more meaningful and effective if they refer to the actual world of human activity by referring, for example, to the urban infrastructure.

1. Spatial Characteristics

Spatial characteristics are calculated by calculating basic spatial characteristics, calculating structural spatial characteristics, and calculating the composite of those results.

The basic spatial characteristics calculation interprets a simple physical reference such as map coordinates as a typical spatial expression such as a station, bank, or post office to obtain a characteristics that can be used to infer user information.

Calculating structural spatial characteristics further incorporates a spatial structure to obtain another characteristics for inferring user information.

This embodiment incorporates the concept of the similarity of spatial structures. The similarity of spatial structures refers, for example, to resemblances seen in urban structures. More specifically, urban structures such as "a bank, post office, department store, park, taxi stand, bus stop, or a rental car company near a station" can be described in a spatial expression list such as shown in equation (1).

$$X\$LST(1) = \{ \text{station|bank, post office, department store, park, taxi stand, bus stop, rental car company, } \ldots \} \quad (1)$$

The location data lists shown as the equations (2), (3), and (4) can then be applied to this spatial expression list to process spatial structures.

$$PLST(l,k) = \{X_k | u_{k,1}, u_{k,2}, u_{k,3}, \ldots \} \quad (2)$$

$$u = (u, v) \quad (3)$$

$$x_{k,m} = X_k + u_{k,m} \quad (4)$$

Banks, post offices, department stores, and other spatial structures are thus expressed with vector variables referenced to the station. Distance can then be expressed as a limiting condition using equation (5).

$$|u_{k,m}| \leq \text{Lnear} \quad (5)$$

where Lnear is defined as approximately 500 m, for example.

The space (place) where the user is currently located can thus be more specifically analyzed by progression from the simple typical spatial expression that the user is "near the station" if a spatial expression list and corresponding location data lists are provided in the system. Furthermore, using a similarity definition as described above enables substantially the same inference to be used anyplace in the world.

That is, if the user is at a station, or if the user goes to a station, then the system can determine that there is a high likelihood that a {bank, post office, department store, park, . . . } is in the vicinity. By thus using such structural spatial characteristics, user information, which is greatly affected by space, can be more appropriately inferred.

Furthermore, by applying additional general rules to the structural spatial characteristics, user actions, such as taking a rest in a part or department store, can be inferred for a particular user condition, such as a high degree of fatigue. Some such general rules include, for example, that if the user goes to the bank then {money can be withdrawn, an account can be opened, the air conditioning will be on, deposits can be made, money can be exchanged}, or if the user goes to the department store then {the air conditioning will be on, there will be many people, a meal can be eaten, there is a toilet, there is a parking lot}, or if the user goes to the park then {the user can rest, the user can play sports, the user can view flower gardens, children can play, a box lunch can be eaten}.

It should be noted that information relating to space, including the spatial characteristics, is referred to below as "spatial information."

2. Temporal Characteristics

Calculating temporal characteristics includes calculating basic temporal characteristics, calculating periodic temporal characteristics, and calculating the composite of these.

Calculating the basic temporal characteristics converts time as a simple physical quantity to a typical time expression such as {morning, noon, evening, night, midnight, spring, summer, fall, winter, . . . } for use inferring user information.

A temporal expressions list as shown in equation (6) containing typical time expressions as elements is defined so that these time concepts can be appropriately expressed at different places around the world. It should be noted that time differences are referenced to Greenwich Mean Time (GMT).

$$T\$LST(1) = \{ \text{time difference|morning, noon, evening, night, midnight, spring, summer, fall, winter, } \ldots \} \quad (6)$$

A time data list, which is a list representing numeric time data corresponding these typical time expressions, is defined for the temporal expressions list as shown in equation (7).

$$TLST(l,k) = \{T_k | dt_{k,1}, dt_{k,2}, dt_{k,3}, \ldots \} \quad (7)$$

A typical time expressions using equation (7) and GMT, for example, is defined by equation (8).

$$t_{k,m} = T_k + dt_{k,m} \quad (8)$$

Equation (9) defines a condition limiting the time range.

$$DTFROM(k,m) \leq dt_{k,m} < DTT0(k,m) \quad (9)$$

By thus providing the system with a temporal expressions list such as above and a corresponding time data list, user information can be more appropriately inferred based on temporal characteristics taking a time difference into consideration.

Calculating periodic temporal characteristics infers user information by incorporating time periods in the typical temporal expressions.

For example, if the user information is expressed with numeric attributes, the numeric attributes can be expressed as a(t) where t is a time function. The period of this numeric attribute a(t) is defined as the periodic temporal characteristics, and is calculated as a weight coefficient and offset function of the elementary function a0(t). That is, if numeric attribute a(t) is defined by equation (10) using weight coefficient Cdwmyc and offset function Poff, periodic temporal characteristics can be expressed as shown in equations (11) to (24).

$$a(t)=Cdwmyc*a0(t)+Poff \quad (10)$$

$$Poff=Pday+Pweek+Pmonth+Pyear+Pcentury+Plife \quad (11)$$

$$Cdwmyc(t)= Cday(t)*Cweek(t)*Cmonth(t)*Cyear(t)*Ccentury(t)*Clife(t) \quad (12)$$

$$Cday(t+tTday)=Cday(t) \quad (13)$$

$$Cweek(t+tTweek)=Cweek(t) \quad (14)$$

$$Cmonth(t+tTmonth)=Cmonth(t) \quad (15)$$

$$Cyear(t+tTyear)=Cyear(t) \quad (16)$$

$$Ccentury(t+tTcentury)=Ccentury(t) \quad (17)$$

$$Clife(t)=Cuser\#life(t\text{-tub}) \quad (18)$$

$$Pday(t+tTday)=Pday(t) \quad (19)$$

$$Pweek(t+tTweek)=Pweek(t) \quad (20)$$

$$Pmonth(t+tTmonth)=Pmonth(t) \quad (21)$$

$$Pyear(t+tTyear)=Pyear(t) \quad (22)$$

$$Pcentury(t+tTcentury)=Pcentury(t) \quad (23)$$

$$Plife(t)=Puser\#life(t\text{-tub}) \quad (24)$$

where tub: the time when the user was born a0(t): elementary function of attribute value with period less than or equal to one day Tw$': time period indicative of time concept of w$ C'w$': weight coefficient with period T'w$'

P'w$': offset function of period T'w$'

Figure 9:
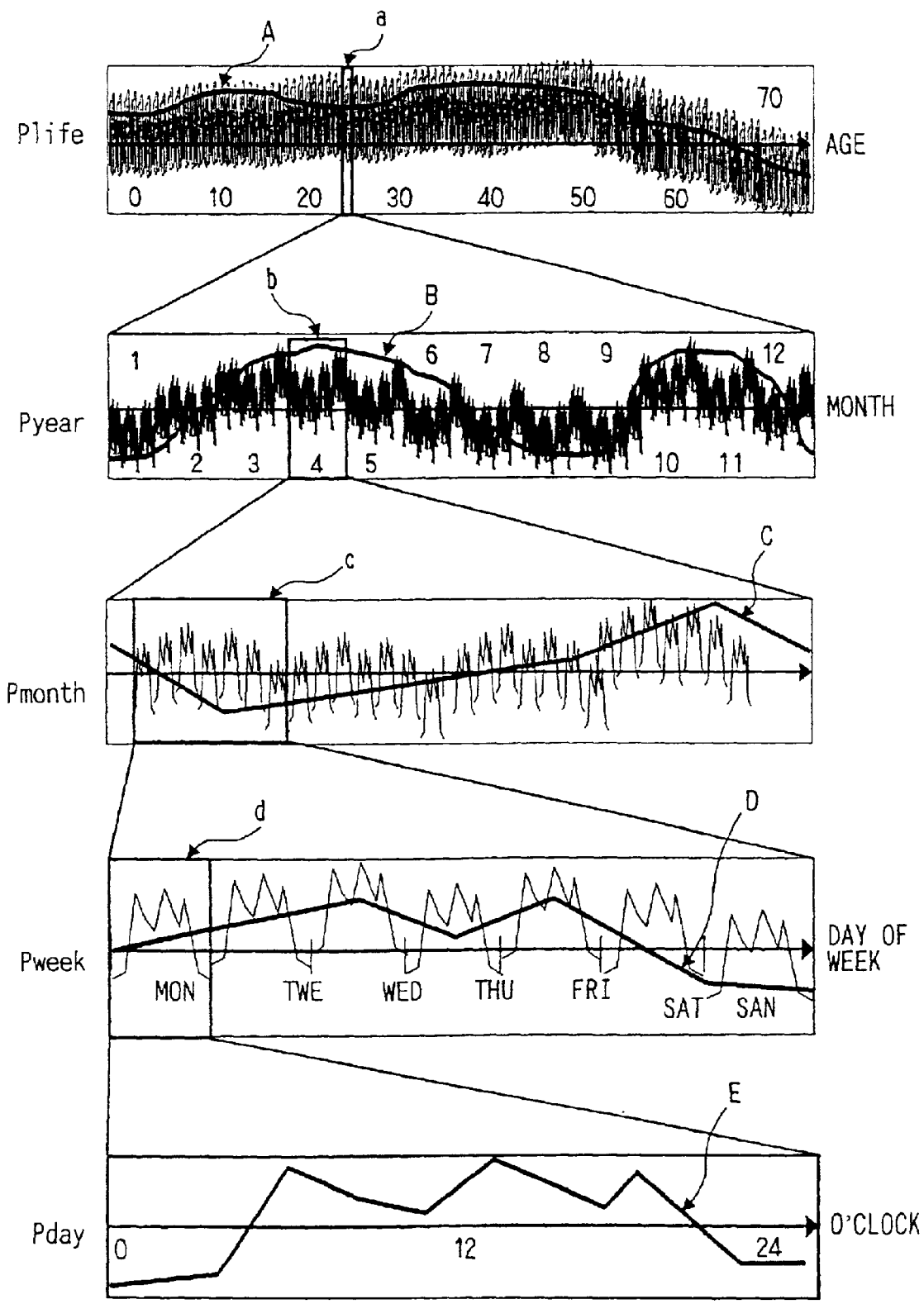
FIG. 9 shows periodicity of temporal elements.

The offset functions are as shown in FIG. 9 where the functions Plife, Pyear, Pmonth, Pweek, and Pday are shown in order from the top row as solid lines A, B, C, D, and E. Further, the Pyear function is shown enlarged for segment a in the Plife function; Pmonth is shown enlarged for segment b in the Pyear function; Pweek is shown enlarged for segment c in the Pmonth function; and Pday is shown enlarged for segment d in the Pweek function.

Figure 10:
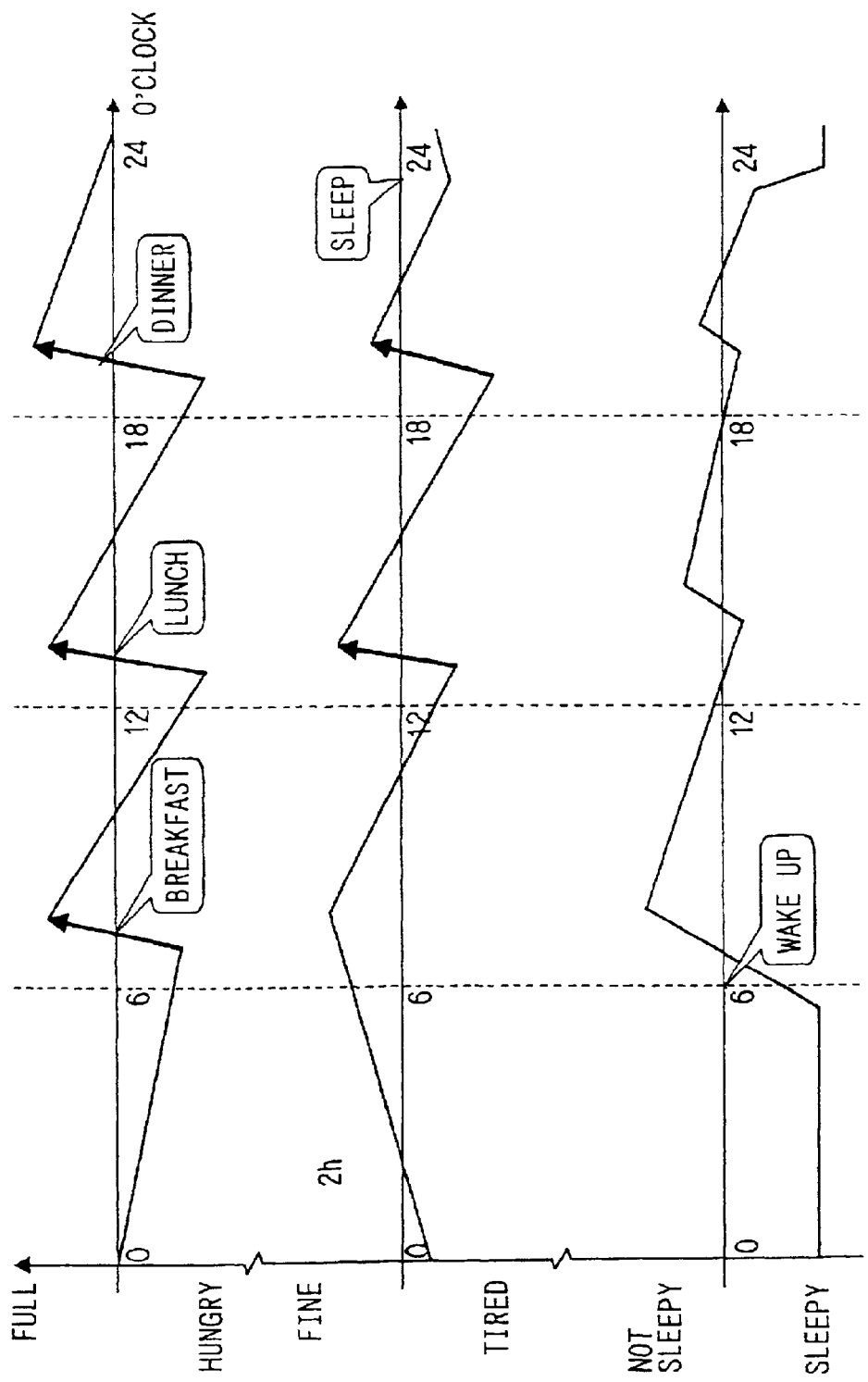
FIG. 10 shows an elementary function with a period of one day.

The elementary function a0(t) is shown in FIG. 10 by way of example. FIG. 10 shows the time change in user hunger on the top row, fatigue in the middle row, and sleepiness on the bottom row.

To calculate the periodic temporal characteristics, characteristics such as user hunger, fatigue, and sleepiness are defined as common functions as shown in FIG. 10, user information (the condition items in this case) is presumed to be inferable as a numeric attribute based on these functions, and a weight coefficient and offset function are calculated based on a time period matched to the user.

Information relating to time, including these temporal characteristics, is referred to as "temporal information" below.

3. Temporal Model, Spatial Model, Event Model

Figure 11:
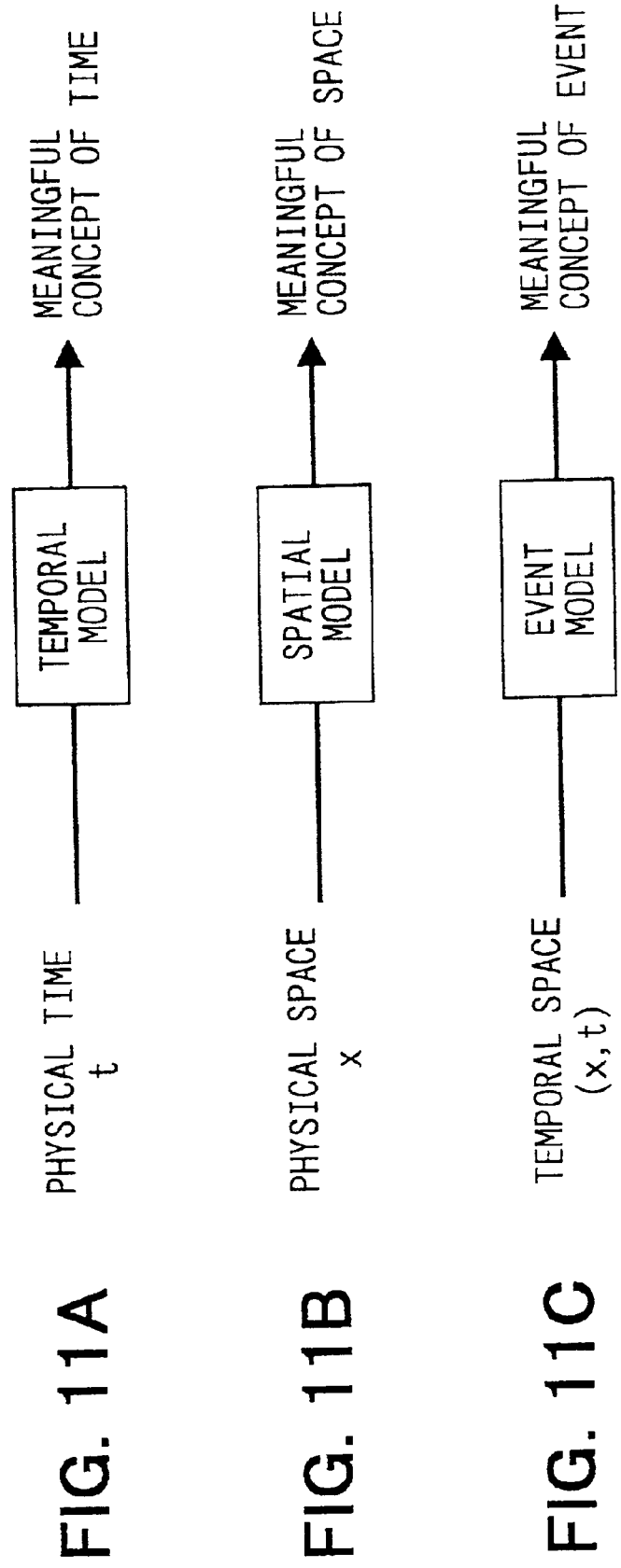
FIGS. 11A to 11C show roles of a temporal model, spatial model, and event model.

As shown in FIGS. 11A to 11C, introducing a temporal model in the form of a temporal expressions list and time data list enables the system to interpret a physical time t as a meaningful concept of time. In addition, introducing a spatial model in the form of a spatial expressions list and location data list enables the system to interpret a physical space x as a meaningful concept of space.

It should be noted that while temporal information and spatial information are separately described above, they can be handled in the real world as temporal space. It will be further noted that by introducing time and space models, that is, an event model, to this system, the present embodiment interprets temporal space (x,t) using the concept of meaningful events.

Figure 12:
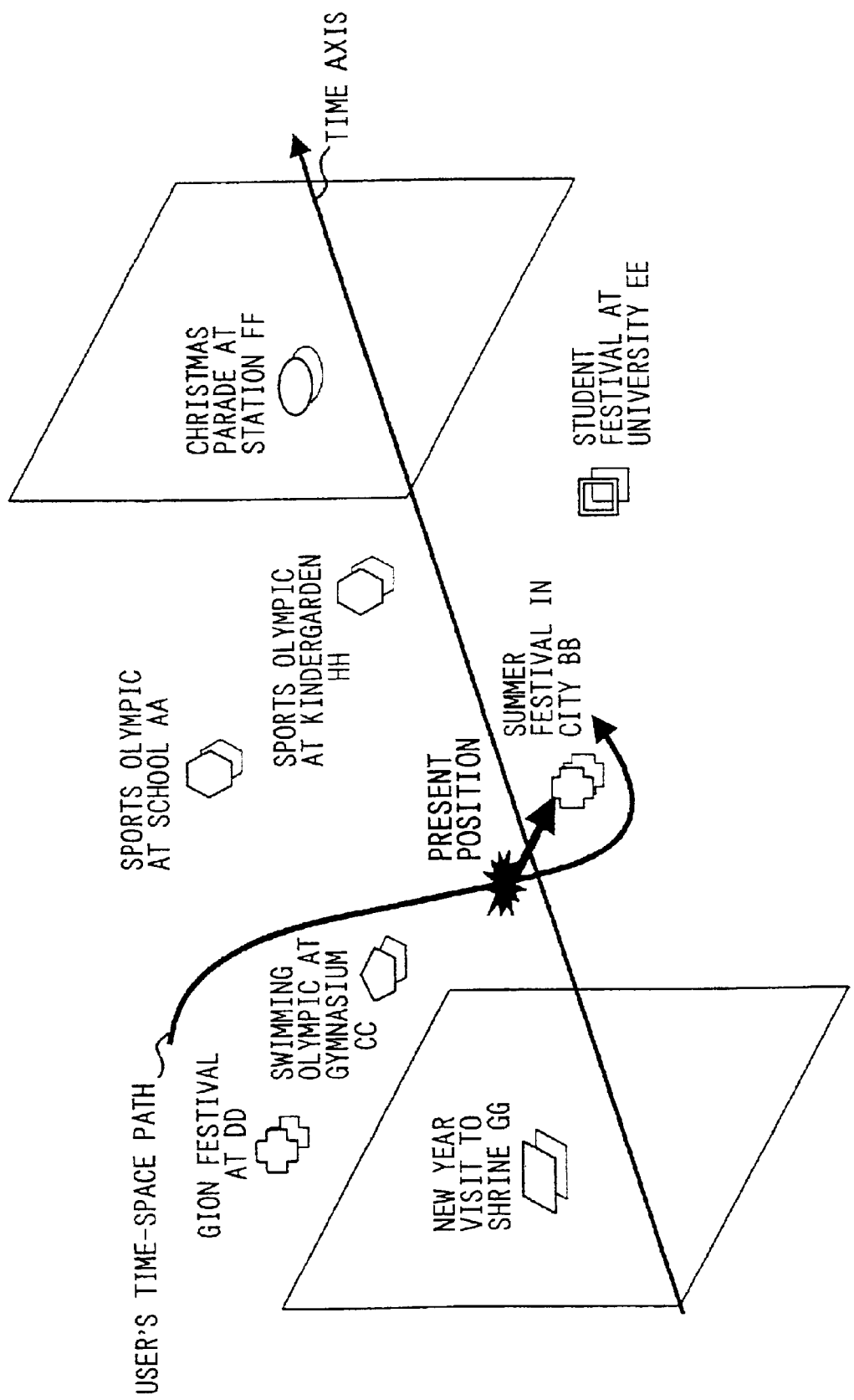
FIG. 12 shows selection of event information with reference to temporal space.

For example, event information relating to events that take place at different times and places during the year can be expressed in a temporal space such as shown in FIG. 12. If the path of the user through temporal space is cross referenced to the temporal space such as shown in FIG. 12, a more appropriate guide to events can be presented based on the user information. More specifically, the system selects appropriate event information at a suitable time-space distance from the user's time-space path. For example, if the user's time-space path is as shown in FIG. 12, then the system would provide guidance for the summer festival in city BB.

Reference is now made to the environment inferring unit 110 shown in FIG. 8 again.

Position data is input to a spatial characteristics calculation block 111 from a GPS receiver, and time data is input to a temporal characteristics calculation block 112 from a system clock, for example. That is, the environment items inferred by the environment inferring unit 110 include both temporal information and spatial information, and a temporal characteristics based on this time data as a physical quantity and a spatial characteristics based on this position data as a physical quantity are both calculated. It is, however, not necessary to calculate the spatial characteristics and temporal characteristics every time from the time data and position data input as physical quantities because the estimated environment values determined by the environment inferring unit 110 are fed back as initial environment values.

The spatial characteristics calculation block 111 and temporal IS characteristics calculation block 112 also calculate the spatial characteristics and temporal characteristics of the environment using the situation data. More specifically, a priority determination block 113 determines the priority of the situation data input from the environment inferring unit 110 in the environment items, and then passes the situation data to the spatial characteristics calculation block 111 and temporal characteristics calculation block 112.

The calculated spatial characteristics and temporal characteristics, the situation data from the priority determination block 113, and external individual data are input to an environment evaluation block 114. Based on this information, the priority determination block 113 references a rule calculation block 115 and environment list 120, and evaluates the environment. "Evaluate the environment" means to infer the environment items. The environment items recorded in the active environment list 120a of the environment list 120 are inferred with priority at this time.

It should be noted that all environment items will not necessarily be inferred by the environment evaluation.

Furthermore, while it is not necessary to infer all environment items, some items, such as those in the active environment list 120a, will preferably be determined. An undetermined values inference block 116 of this embodiment therefore infers incomplete or indeterminate values based on the evaluation output by the environment evaluation block 114 and the situation data from the priority determination block 113. The undetermined values inference block 116 references the rules calculation block 115 and environment list 120 to make this inference.

The rule calculation block 115 interprets the rule group stored in the rule database 70. This rule database 70 is further described below.

The external individual data is input from the interaction device 80, and may be thought of as the content written in the user profile. For convenience, the environment list 120 shown in FIG. 2 is stored in the environment inferring unit 110.

(3-2) Circumstance Inferring Unit 210

Figure 13:
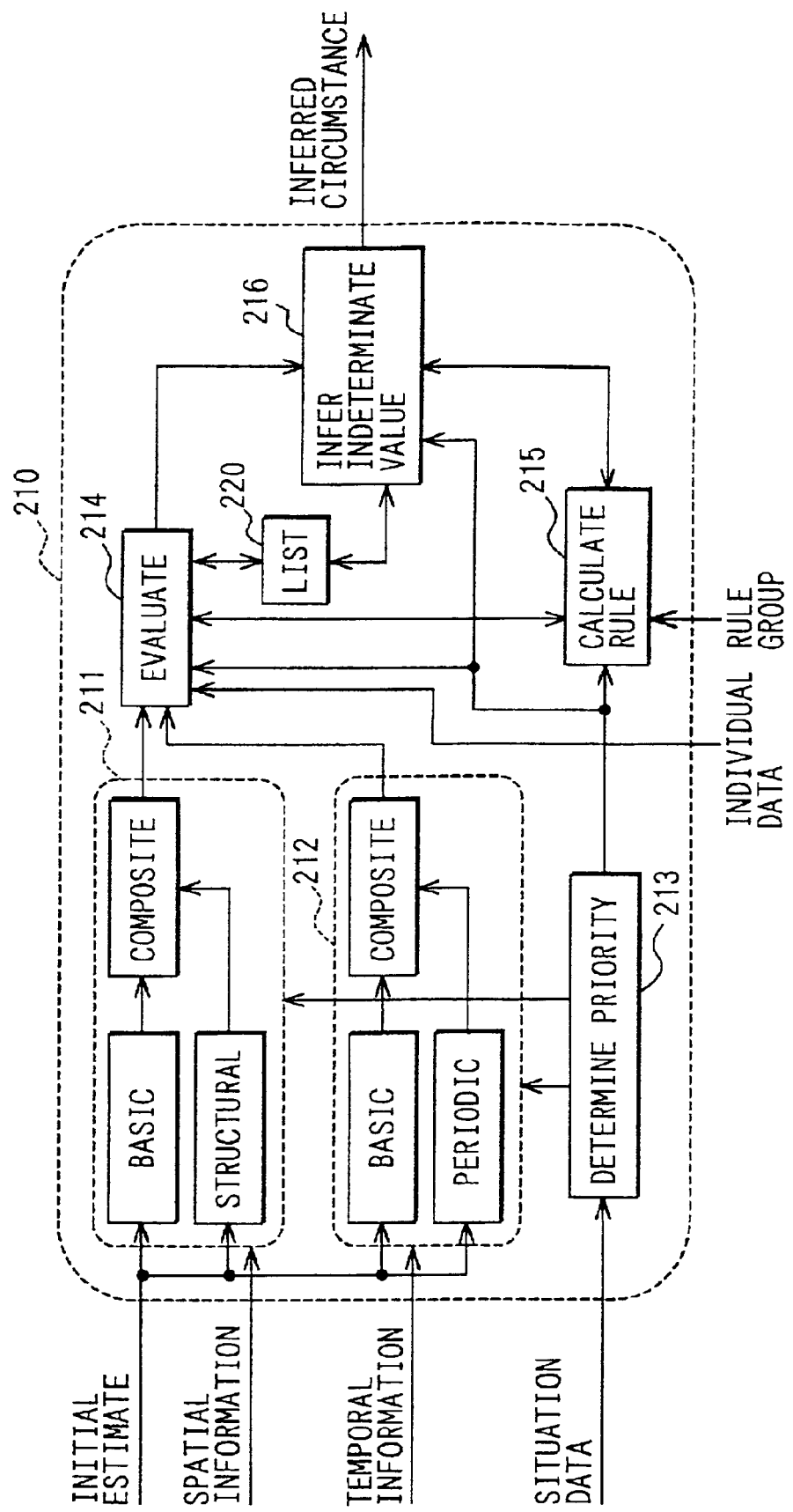
FIG. 13 shows functions of the circumstance inferring unit.

FIG. 13 is a function block diagram for describing the operation of the circumstance inferring unit 210.

The circumstance inferring unit 210 has substantially the same configuration as the environment inferring unit 110 shown in FIG. 8. However, while position data and time data are input to the environment inferring unit 110, the spatial and temporal data calculated by the environment inferring unit 110 is input to the circumstance inferring unit 210.

A spatial characteristics calculation block 211 calculates the spatial characteristics and a temporal characteristics calculation block 212 calculates the temporal characteristics used to infer the circumstance. A priority determination block 213 determines the priority of the input situation data in the circumstance items.

Figure 14:
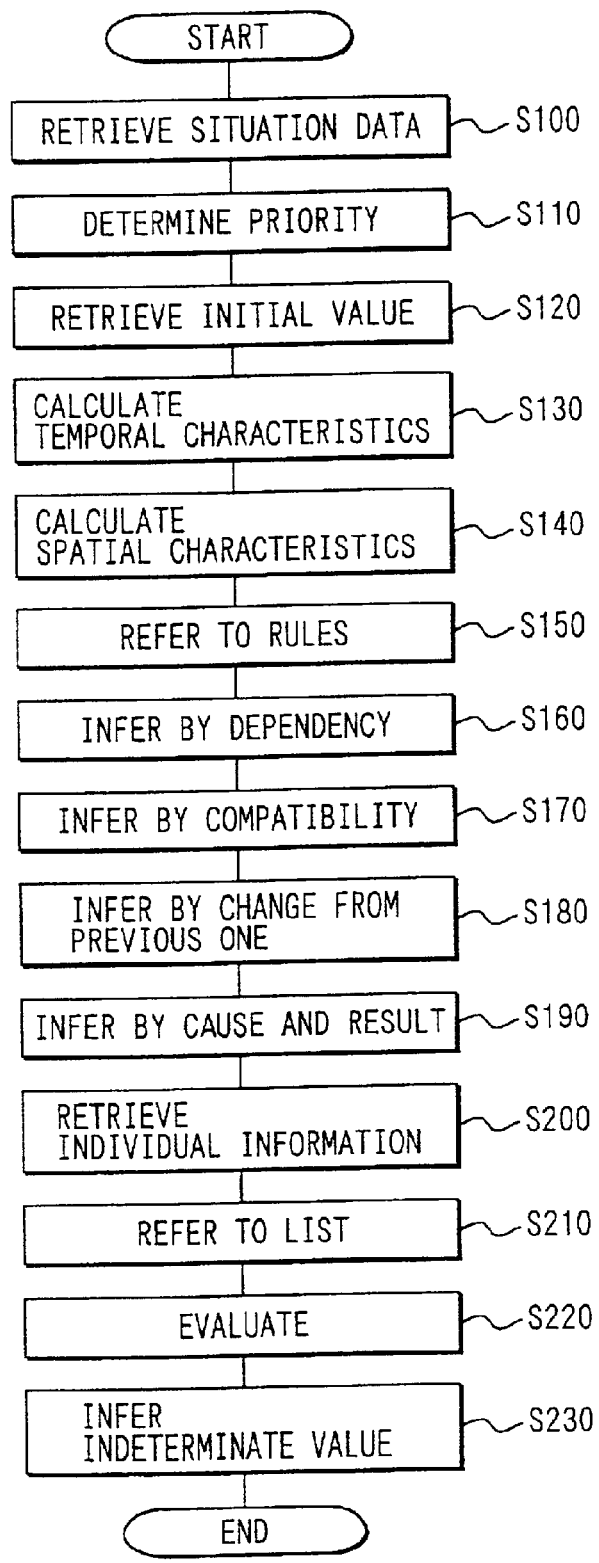
FIG. 14 shows a flow chart of a process is executed by the circumstance inferring unit.

It should be noted that the relationship between the functional blocks is the same as in the environment inferring unit 110, and operation is therefore described next below with reference to the flow chart shown in FIG. 14.

The situation data is first retrieved in step S100 (subsequent steps simply indicated by the prefix "S" below), and the priority is then determined in S110. This step is executed by the priority determination block 213, and determines the priority of the circumstance items.

The initial estimate of the circumstance is then retrieved and determined in S120. The circumstance inference output from the circumstance inferring unit 210 at the previous iteration is used in this step S120. Based on the initial estimate of the circumstance, the time data, and the situation data, the temporal characteristics of circumstance is calculated in S130. This process is executed by a temporal characteristics calculation block 212, and includes calculating the fundamental temporal characteristics, periodic temporal characteristics, and the synthesis of the two results.

Based on the initial circumstance estimate, spatial data, and situation data, the spatial characteristics of the circumstance are calculated in S140. A spatial characteristics calculation block 211 calculates this step, which includes calculating the fundamental spatial characteristics, structural spatial characteristics, and the synthesis of these results.

The rules are then referenced in S150. In this step a circumstance evaluation block 214 references the rules group, which is read from the rule database 70 and interpreted by a rule calculation block 215. A circumstance evaluation block 214 makes the inferences in steps S160 to S190 by applying these rules.

Circumstance that depend upon the environment is inferred in S160. The compatibility of the circumstance is then estimated in S170. An inference based on the previous circumstance is then completed in S180. This step infers a change in circumstance based on the spatial characteristics and temporal characteristics. Step S190 then infers the circumstance based on a cause and effect relationship. The rules group stored in the rule database 70 is thus interpreted by a rule calculation block 215, and the interpreted rules are used to infer various circumstance.

Individual information from the user is then retrieved in S200. A circumstance evaluation block 214 performs this step. The circumstance evaluation block 214 references the circumstance list in the next step S210, and then evaluates the circumstance in S220.

Incomplete or indeterminate values are then estimated in S230 by an indeterminate (ambiguity) inference block 216.

(3-3) Condition Inferring Unit 410

The user's condition is closely related to user requests and desires. For example, a desire "to eat" arises from a "hungry" condition, and a desire "to rest" arises from a "tired" condition. This embodiment infers the user's desire by defining and optimizing a condition model. While the sequence differs from (2) above, the condition inferring unit 410 is therefore described first below.

Figure 15:
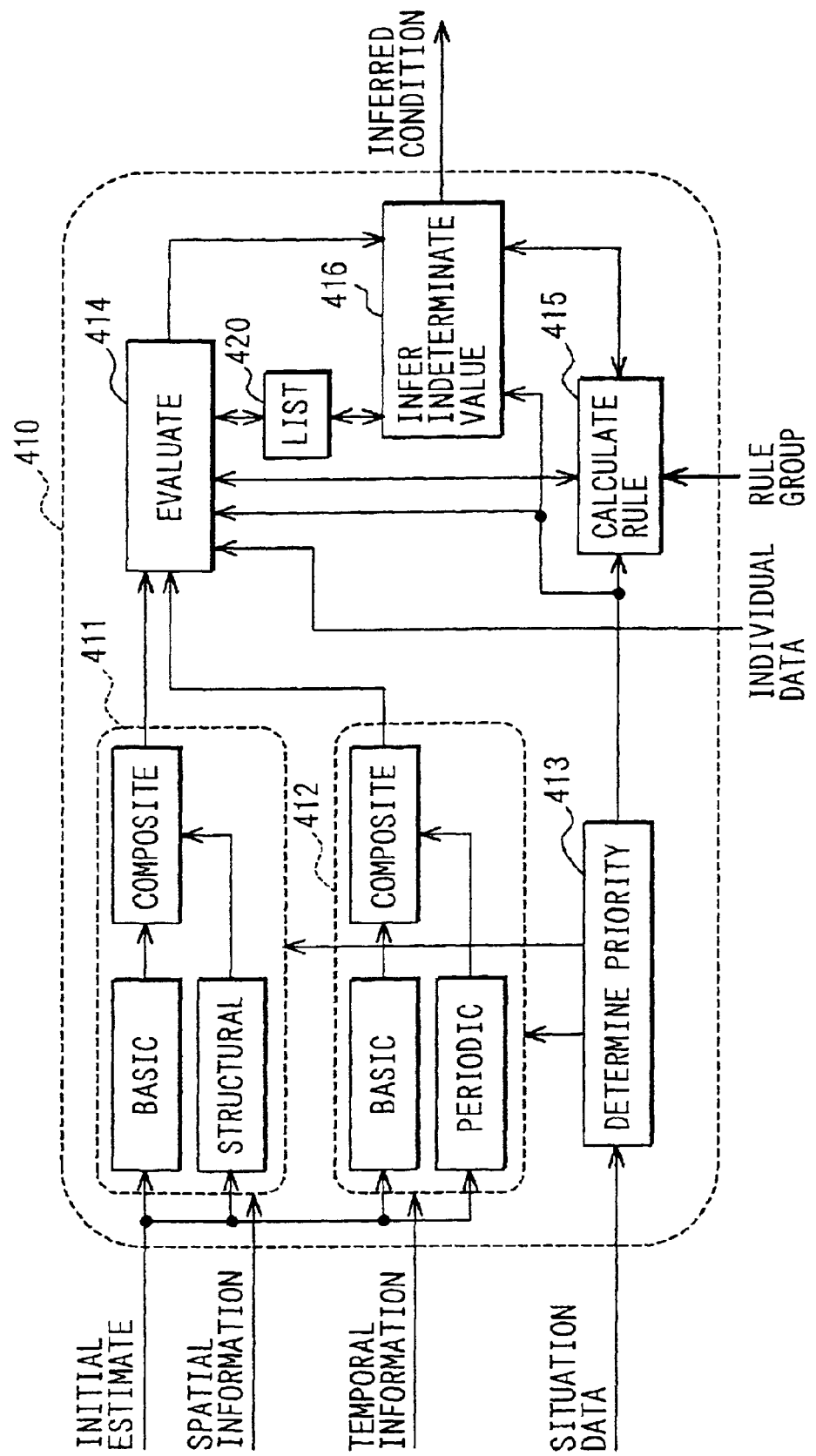
FIG. 15 shows functions of the condition inferring unit.

The configuration of the condition inferring unit 410 shown in FIG. 15 is the same as that of the environment inferring unit 110 and circumstance inferring unit 210 in that it has a spatial characteristics calculation block 411, temporal characteristics calculation block 412, condition evaluation block 414, rule calculation block 415, and indeterminate inference block 416.

The condition estimate returned by the condition inferring unit 410 is stored as the condition model 430 of the conditions calculator 40. The condition model 430 is stored in the form of condition vectors. These condition vectors are described first below.

(3-3-1) Condition Vectors

We propose here a method for correlating natural language expressions of various conditions to numerical expressions. Vector q having N condition quantities qi (i=1, ... N) is defined as a condition vector.

$$q=(q1, q2, \ldots, qN) \tag{25}$$

These condition vectors are vectors for the condition values of the condition items described below.

Consider, for example, ten conditions with condition values from [−8] to [7] expressed with a signed 4 bit expression. The levels defined below are used to correlate a natural language expression to a numeric value. The properties describe the change in a condition based on a common sense evaluation. A change in condition as a result of the spatial characteristics and temporal characteristics can be easily calculated by the present system using expressions of various conditions such as described below. It should be noted that the words are typical descriptors quantifying the various conditions, and the correlation to other words (such as "I'd like to eat something," I'm hungry," and "I'm so hungry I could eat a horse" in reference to how hungry the user is that might be input by the user through a voice interactive system, for example, for the same condition is determined by the system with reference to a voice recognition dictionary.

q1: Degree of hunger

A) levels

{full (7–5), almost full (4, 3), average (2 to −2), hungry (−3 to −5), famished (−6 to −8)}

B) properties

Level drops over time unless the user eats.

Level increases with a meal or rest.

q2: Degree of thirst
A) levels
{can't drink (7–5), don't want to drink (4, 3), could drink (2 to −2), thirsty (−3 to −5), parched (−6 to −8)}
B) properties
easily become thirsty when it is hot
level increases when the user drinks
level usually increases with meal or rest q3: Sleepiness
A) levels
{wide awake (7–5), not sleepy (4, 3), average (2 to −2), sleepy (−3 to −5), can't stay awake (−6 to −8)}
B) properties
Level drops with extended driving.
Level drops with increase in fatigue q4: Irritation
A) levels
{very calm (7–5), fairly calm (4, 3), average (2 to −2), irritated (−3 to −5), very irritated (−6 to −8)}
B) properties
Level drops with extended driving.
Level drops with increase in fatigue
Level drops with hunger, thirst, fatigue, heat q5: Temperature
A) levels
{very hot (7–5), somewhat hot (4, 3), average (2 to −2), somewhat cold (−3 to −5), very cold (−6 to −8)}
B) properties
Seasonally dependent (cyclical)
Varies with time of day.
Affected by air conditioning; level decreases with air conditioning (cooling), increases with heating.
Affected by window opening
Varies with user health, physical condition
Increases, decreases with fatigue q6: Fatigue
A) levels
{feel great (7–5), feel good (4, 3), average (2 to −2), a bit tired (−3 to −5), very tired (−6 to −8)}
B) properties
Affected by driving time, degree of hunger, traffic congestion q7: Sense of dissatisfaction
A) levels
{very satisfied (7–5), somewhat satisfied (4, 3), average (2 to −2), somewhat dissatisfied (−3 to −5), very dissatisfied (−6 to −8)}
B) properties
Affected by driving time, degree of hunger, traffic congestion
Positive correlation to degree of irritation q8: Need to use toilet
A) levels
{perfectly fine (7–5), fine (4, 3), average (2 to −2), want to use (−3 to −5), must use (−6 to −8)}
B) properties
Relatively high level when thirsty
Decreases after meals q9: Physical comfort
A) levels
{feel great (7–5), feel good (4, 3), average (2 to −2), not very good (−3 to −5), feel lousy (−6 to −8)}
B) properties
Affected by physical state, meals
Correlation to fatigue, dissatisfaction q10: Degree of anger
A) levels
{feel great (7–5), feel good (4, 3), average (2 to −2), irritated (−3 to −5), angry (−6 to −8)}
B) properties
Affected by degree of irritation, dissatisfaction
Can often be determined from user's voice, words While the condition vectors described above have ten dimensions, this number can be increased according to the range of human conditions expressed with everyday natural language expressions.

Condition vectors are handled as follows in this embodiment of the invention.

Condition levels change over time.

While condition levels are subject to individual differences, a common sense or average level can also be defined for people in general.

Condition levels are not constantly observable, and therefore also have an ambiguous component.

Some conditions cannot be measured, and the condition vectors therefore have an incomplete component.

All condition vector components do not have the save weight (effect) when calculating the user request.

The temporal characteristics and spatial characteristics of the conditions can be described as follows by writing the condition model using the above specific condition vectors described by way of example.

(3-3-2) Description of Temporal Characteristics

Conditions that changes (that is, the level drops) over time unless there are specific external factors can be described with equation (26).

$$qk(t+1)=qk(t)-Dqk \quad (26)$$

where Dqk is not always constant. The value of Dqk can be changed, for example, by the rule calculation block 415 shown in FIG. 15 interpreting and applying the rules group recorded in the rule database 70.

Furthermore, the elementary function shown in FIG. 10 can be expressed by defining the weight condition vector qs for condition vector q using equation (27).

$$qs=Wq \quad (27)$$

where W is an N row, N column weight coefficient matrix. In practice, a diagonal matrix as shown in equation (28) can be used.

$$W=diag(w1, w2, \ldots, wN) \quad (28)$$

Based on this, the temporal cycle of a particular condition is defined for both the condition level and the weight coefficient for each condition.

(1) Periodicity of Condition Levels

Periodic functions can be defined using equations (29) and (30).

$$q(t)=q(t+T) \quad (t<0 \text{ or } t \geq T) \quad (29)$$

$$q(t)=q0(t) \quad (0 \geq t < T) \quad (30)$$

where T is a period equivalent to one day, one week, one month, or one year. Hunger, for example, has a period of one day. Conditions will vary from person to person, however, and even day to day in the same person. This can be defined as a user characteristics as in equation (31).

$$Qu(t)=q(t)+DQu(t) \quad (31)$$

That is, while a particular condition is generally periodic for all individuals, there is a specific deviation DQu(t) for a particular user. If the condition characteristics of the average person is periodic function q(t), then equation (32) will be true.

$$\lim(\Sigma DQu(t))=0 \tag{32}$$

where $\Sigma$ is the sum of 1 to NU for U, and lim is the limit for NU$\to\infty$.

The periodicity of priority is described by equation (33).

$$wk(t)=wk(t+T) \tag{33}$$

where T is a period equivalent to one day, one week, one month, or one year. The condition vectors relating to condition levels having definable periodicity are therefore the condition, weight coefficient, and periodic function, and the weight condition qsk of the period coefficients is as shown in equation (34).

$$qsk=wk(t)qk(t) \tag{34}$$

(2) Description of Spatial Characteristics

Equation (35) can be used if the function SCategory(x) is used. SCategory(x) outputs a typical spatial expression of a location from spatial coordinates.

$$\text{If } SCategory(x1)=SCategory(x2), \text{ then } qi(x1)=qi(x2) \tag{35}$$

This equation means that if typical spatial expressions are the same, then the condition levels can be assumed equal. That is, the spatial similarity of a condition can be defined by equation (35). However, this is the spatial similarity when there is no dependence on circumstance or the particulars of the preceding change in condition.

The condition vector indicative of user condition is described above. It will be obvious that similar vectors can be described for the environment, circumstance, and other user information. When such environment vectors and circumstance vectors are defined, then corresponding environment models and circumstance models can also be constructed.

(3-3-3) Operation of Condition Inferring Unit 410

Figure 16:
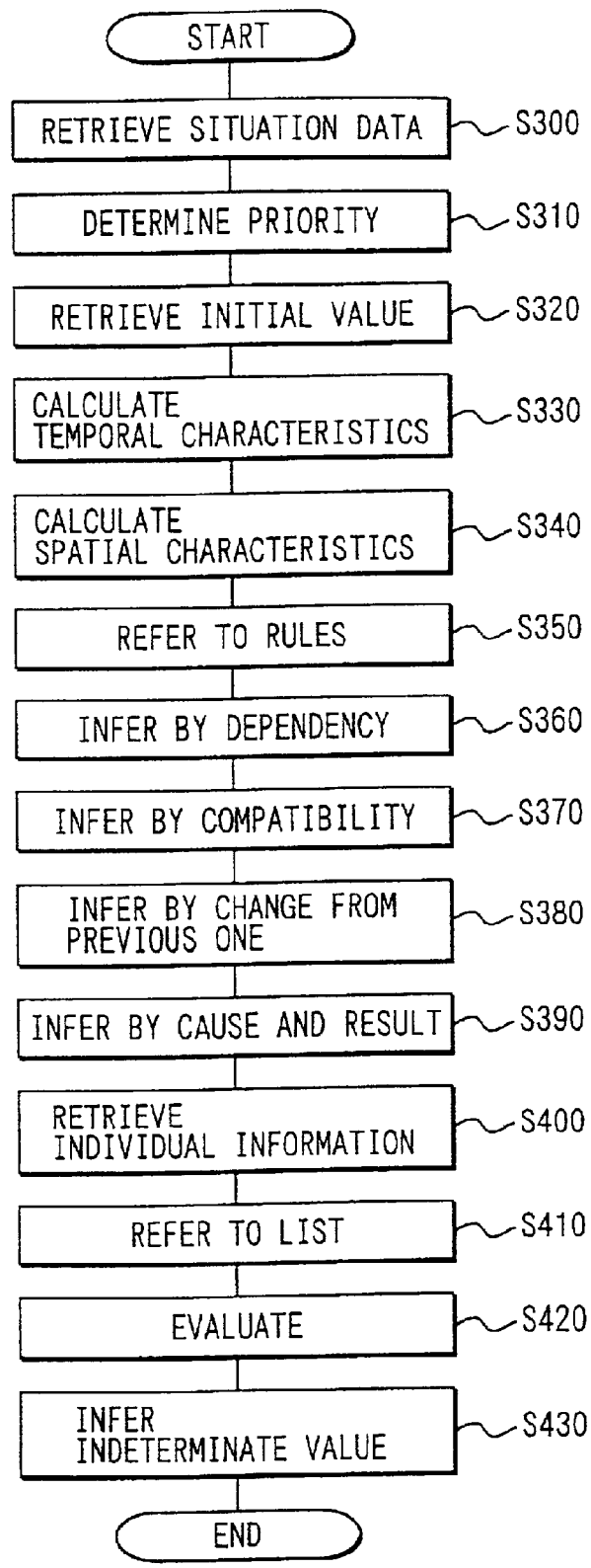
FIG. 16 shows a flow chart of a process is executed by the condition inferring unit.

Except for the use of condition vectors as described above, operation of the condition inferring unit 410 is substantially the same as the operation of the circumstance inferring unit 210. The process run by the condition inferring unit 410 is therefore briefly described below with reference to the flow chart in FIG. 16.

The first step when the process starts is to retrieve the situation data (S300), then determine the priority of the condition items (S310). The initial estimate is then retrieved (S320), and the temporal characteristics and spatial characteristics are calculated (S330, S340). The rules are then referenced (S350) to infer conditions dependent on the environment (S360), estimate the compatibility of the conditions (S370), make an inference based on the previous request (S380), and make an inference based on a causal relation (S390). Individual data is then retrieved (S400), the condition list referenced (S410), and the condition evaluated (S420). Finally, incomplete or indeterminate values are inferred (S430).

(3-4) Request Inferring Unit 310

Figure 17:
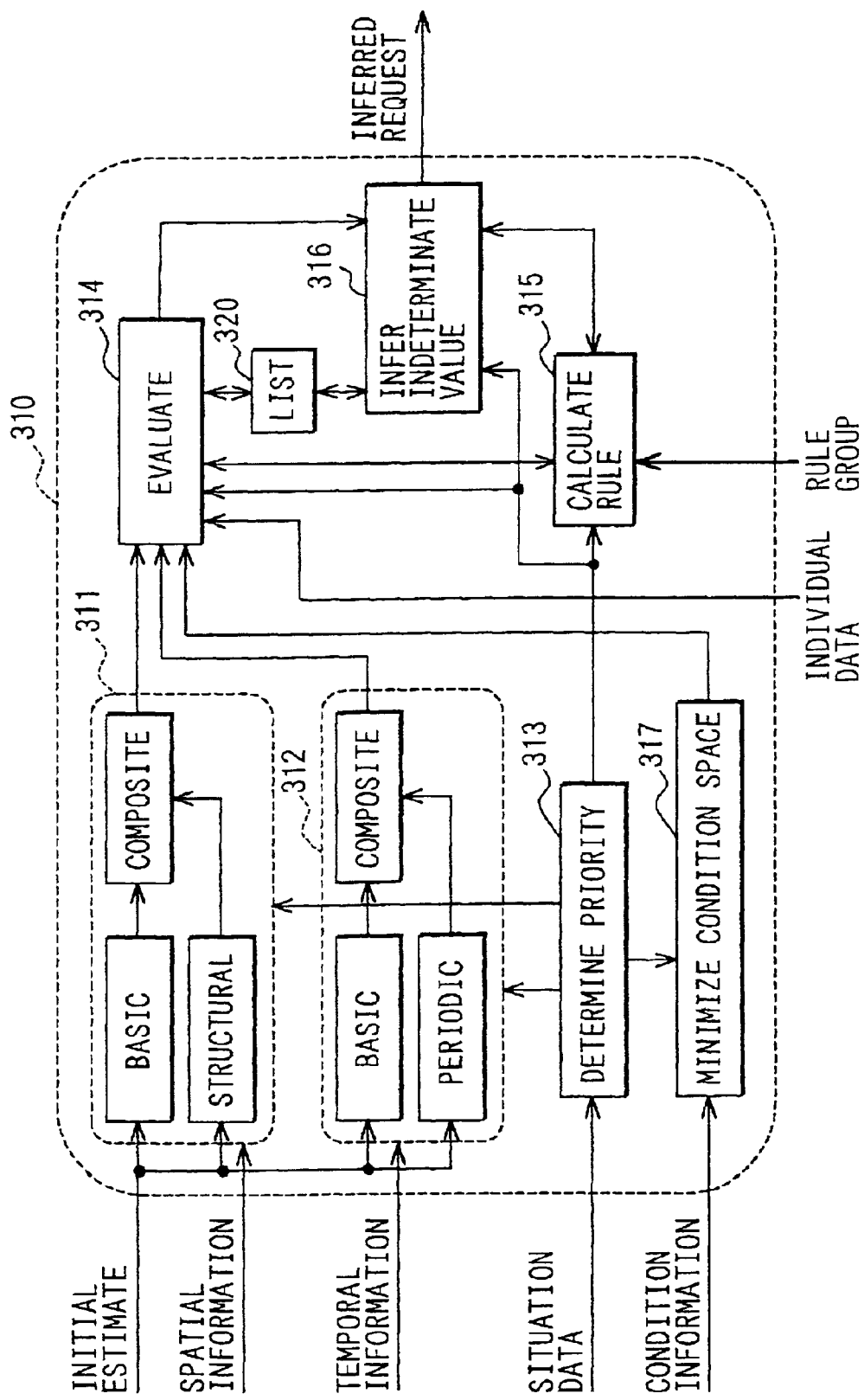
FIG. 17 shows functions of the request inferring unit.

FIG. 17 is a function block diagram of a request inferring unit 310. The configuration of the request inferring unit 310 is substantially identical to the configurations of the inferring units 110, 210, and 410.

The request inferring unit 310 differs from the above inferring units in that it further comprises a minimization calculator block 317 for minimizing the condition space using the input condition vectors, which as described above define the conditions model 430 and are input to the minimization calculator block 317 as condition data, and evaluating the user request based on the optimized condition space obtained by this minimizing operation. Prioritized situation data is also supplied to the minimization calculator block 317 from a priority determination block 313, and is used by the minimization calculator block 317 for this optimization operation.

(3-4-1) The optimize operation performed by the minimization calculator block 317 is described first.

User request items can be represented by request vectors r similarly to the above condition items above. If it is assumed that the request vector r can be inferred from primarily space, time, and user condition, then the request inference function can be written as shown in equation (36).

$$r=g(x, t, q) \tag{36}$$

If it is further assumed that "user requests are decided in order to optimize the user condition," then function g in equation (36) can be defined by the minimize function shown in equation (37).

$$\text{minimize } d(q, q_{opt}) \text{ subject to } \{x \text{ is in an assumed range, } t \text{ is in an assumed time}\} \tag{37}$$

where d(a, b) is a function of the distance between two N-dimension vectors a and b; q is an N-dimension vector showing the user condition; and $q_{opt}$ is a vector assuming an optimized user condition at the current time in an N-dimension condition space. This vector $q_{opt}$ is broadly within a substantially constant range, but locally varies according to environmental factors, for example. There is also variation dependent upon individual preferences. Distance function d can be written as an absolute distance with a weight coefficient applied to each component as shown in equations (38) and (39).

$$d(q, q_{opt})=(1/SA)Sai|q1-q_{opt}1| \tag{38}$$

$$SA=\Sigma ai \tag{39}$$

where S indicates the sum of i=1 to N. It is possible to apply the distance calculation preferentially to the dominant condition dimensions in the condition space of the assumed time-space coordinates by controlling the weight coefficient $a_1$. When the condition vectors contain indeterminate or unknown components, the indeterminate components can be removed from the calculation, can be calculated as an unknown X, or can be replaced with an inferred value for the calculations. The method of substituting an inferred value is described further below.

The value of the condition components of the condition vectors change simply in this embodiment. That is, the value of a condition component indicating that the condition is "good" is 0 or 7.

Therefore, minimize $d(q, q_{opt})$ can be written as shown in equation (40) when the condition is optimized with a condition component of 0. Equation (41) can be used in the latter case, that is, with a condition component of 7.

$$\text{minimize } |q_1| \tag{40}$$

$$\text{minimize } |qmax_1-q_1| \tag{41}$$

This minimize operation will not necessarily uniformly minimize all components, and there may be a priority P. This priority P will also vary according to individual characteristics. This priority P can be incorporated in the minimize operation using either of the following two methods.

1. Controlling the Sequence of Minimize Operations Based on a Conditional Evaluation In this case the minimize operations are performed in the sequence q1, q6, q7, for example. Request items are then estimated based on the minimized results. Priority P in this case is written as a numeric sequence such as {1, 6, 7, ... }.

2. Apply a Weight Calculation to Each Condition Value

In this case the minimize operation is calculated by applying a specific weight coefficient to each q, for example, applying a weight coefficient of 100 to q1, 80 to q6, and 70 to q6. Priority P in this case is written as a weight vector w={100, ..., 80, 70, ... }).

It should be noted that the components (weight coefficients) $w_k$ of the weight vector w are affected primarily by time and space, and can be written as shown in equation (42).

$$w_k W_k(t,x) \qquad (42)$$

where $w_k$ is often a discontinuous function with respect to t and x.

(3-4-2) Operation of the Request Inferring Unit 30

Minimizing the condition space is one feature of the request inferring unit 310. Operation of the request inferring unit 310 is otherwise substantially identical to the operation of the circumstance inferring unit 210.

Figure 18:
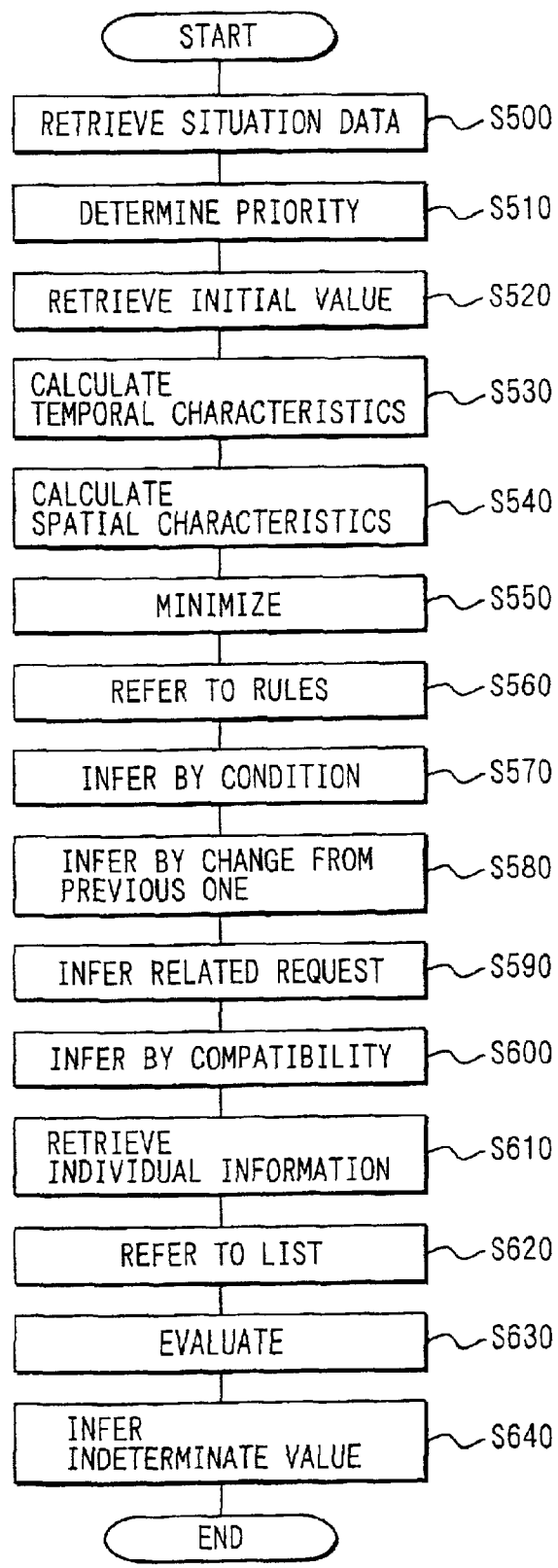
FIG. 18 shows a flow chart of a process is executed by the request inferring unit.

That is, when the request inferring operation shown in FIG. 18 starts, the first step is to retrieve the situation data (S500), and then determine the priority of the request items (S510). The initial estimate is then calculated (S520), and the spatial characteristics and temporal characteristics are calculated (S530, S540).

The minimize operation described above then follows in step S550. This step is the operation performed by the minimization calculator block 317. The rules are then referenced (S560), an inference is made based on the conditions with reference to the rules (S570), a further inference is made based on the previous request (S580), related requests are inferred (S590), and the compatibility of the requests is determined (S600). "Related requests" as used here refers to a secondary request that can be inferred from another request without reference to the user condition. Individual user information is then obtained S610), the request list is referenced (S620), and the request is evaluated (S630).

Figure 19:
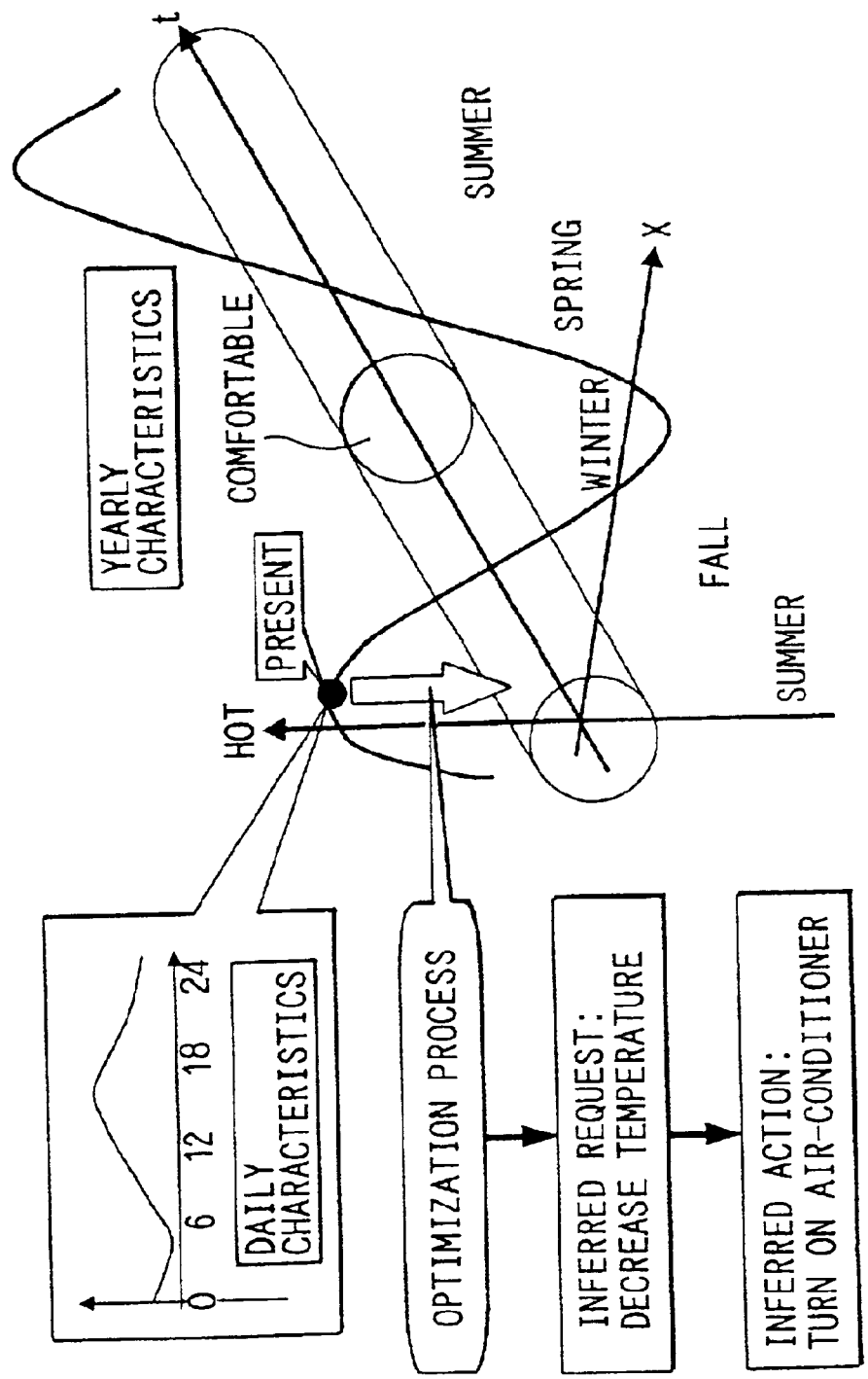
FIG. 19 shows request inferring and action inferring based on optimized conditions.

This request evaluation step S630 also includes request evaluation based on the above minimize operation. Referring to FIG. 19, for example, the condition item "temperature" in the vehicle will vary with a time characteristics having a cycle of one year or one day. Minimizing this condition item, that is, the component of the condition vector, makes it possible to infer that the user wants to decrease (or increase) the temperature. Finally, incomplete or indeterminate values are inferred (S640).

(3-5) Action Inferring Unit 510

Figure 20:
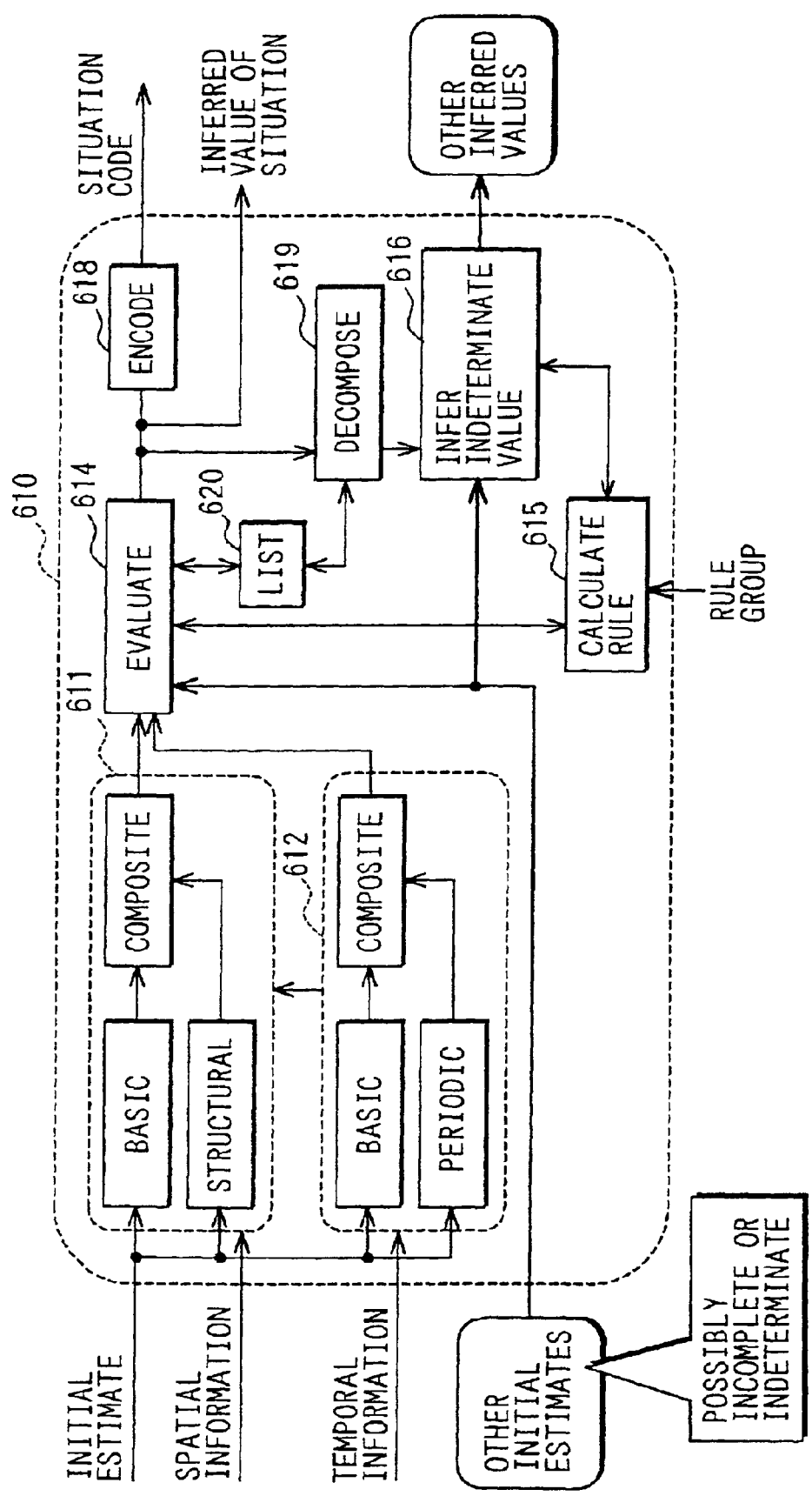
FIG. 20 shows functions of the situation inferring unit.
Figure 21:
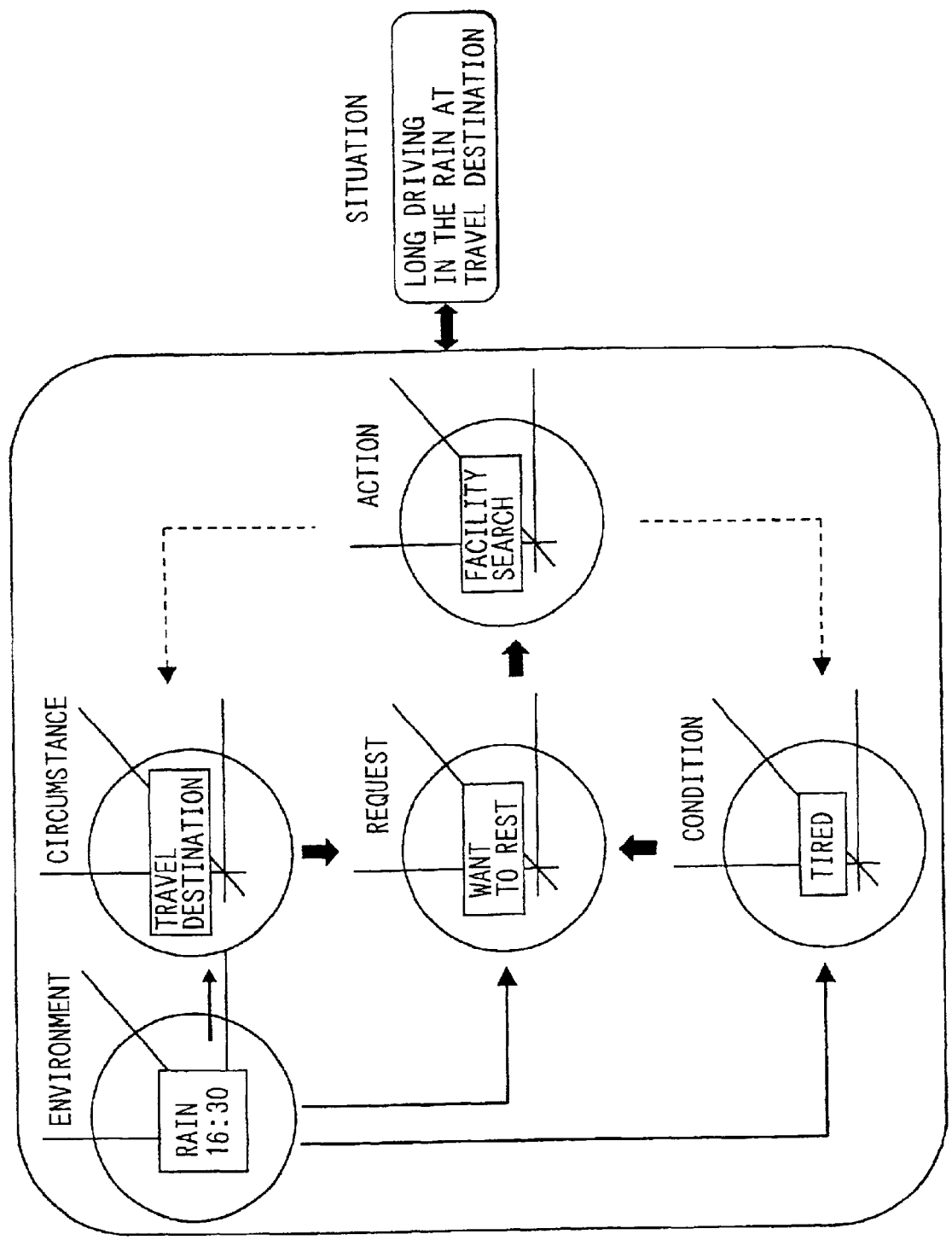
FIG. 21 shows a concept of situation evaluation and decomposition in the embodiment.

The function blocks of the action inferring unit 510 are the same as those of inferring units 110 to 410 as shown in FIG. 20.

(3-6) Inferring Condition, Request, and Actions with Reference to Time-space Characteristics While a request is internally apparent to the user, actions are externally observable movements, and not all requests translate into actions. User actions do, however, arise from user requests. Therefore, just as requests can be inferred from conditions, actions can be inferred from requests.

In addition, conditions, requests, and actions are greatly affected by time and space. It is therefore possible to write the relationship between a condition vector q, a similar request vector r, and an action vector A as shown in equations (43), (44), and (45).

$$q_{n+1} = f(x, t, q_n) \qquad (43)$$

$$r_n = g(x, t, q_n) \qquad (44)$$

$$A_n = h(x, t, r_n) \qquad (45)$$

where x can be translated to spatial expressions list X$LST and location data lists PLST. That is, {i, k, m} in equations (46), (47), (48), and (49) are determined.

$$X\$LST(i)=\{\text{origin}(i)|\text{spot}(i,1), \text{spot}(i,2), \ldots, \text{spot}(i,m), \ldots\} \qquad (46)$$

$$PLST(i,k)=\{X_k|u_{k,1}, u_{k,2}, \ldots, u_{k,m}, \ldots\} \qquad (47)$$

$$u=(u, v) \qquad (48)$$

$$X_{k,m}=X_k+u_{k,m} \qquad (49)$$

Furthermore, t can also be translated to temporal expressions list T$LST and temporal data list TLST. That is, {i, k, m} in equations (50), (51) and (52) are determined.

$$T\$LST(1)=\{\text{time difference}|\text{morning, noon, evening, night, midnight, spring, summer, fall, winter,} \ldots\} \qquad (50)$$

$$TLST(i,k)=\{T_k|dt_{k,1}, dt_{k,2}, \ldots, dt_{k,m}, \ldots\} \qquad (51)$$

$$t_{k,m}=T_k+dt_{k,m} \qquad (52)$$

(3-7) Situation Inferring Unit 610

FIG. 20 is a function block diagram of the situation inferring unit 610. Similarly to the other inferring units 110 to 510, the situation inferring unit 610 has a spatial characteristics calculation block 611, temporal characteristics calculation block 612, situation evaluation block 614, and rule calculation block 615.

Situations comprehensively reflect the five user information items described above, that is, the user environment, circumstance, condition, request, and action. The situation inferring unit 610 evaluates the situation using the spatial characteristics and temporal characteristics based on the spatial and temporal information, and the initial estimates of the environment, circumstance, condition, requests, and actions.

It is assumed, for example, that the inferred environment={rain, 16:00}, circumstance={destination}, request={want to rest}, condition={fatigued}, and action={facility search}. Using this set of five items, the situation inferring unit 610 can infer that the situation ={raining at travel destination, driving for an extended period}. This evaluation is based on the spatial characteristics and temporal characteristics. It will be obvious that plural situations could be inferred from the same set of five items. However, by describing typical situations using detailed user environment, circumstance, condition, request, and action information, the system will be more likely to accurately infer the correct situation based on the nature of the information.

A component decomposition block 619 of the situation inferring unit 610 decomposes the situation, an operation that is the inverse of evaluating the situation. This makes it possible to infer detailed user environment, circumstance, condition, request, and action information from a typical situation.

Situations evaluated in this manner can be coded as an index to the situation dictionary. This enables user information to be collected as dynamically variable labels by data type so that individual user information can be dynamically collected and encrypted, thereby protecting privacy and improving security.

An encoding block 618 of the situation inferring unit 610 encodes the situation data and outputs the situation code. In this embodiment of the invention the situation code is output to the interaction device 80, decoded, and used to control the on-board equipment.

It should be further noted that this situation code can be stored to a smart card or other memory device, or transferred from a remote control device or other communications path to the receiver. The receiver can then decode typical situations for a particular user, the potential for invasion of user privacy can be minimized, and the controlled equipment can be suitably operated for different users.

(4) As will be known from the above descriptions of the operation of the inferring units 110, 210, 310, 410, 510, and 610, the rule calculation blocks 115 to 615 of the respective inferring units 110, 210, 310, 410, 510, and 610 interpret the rules read from the rule database 70 to infer the respective information by applying the rules.

The rule database 70 is therefore described next below.

The rule database 70 stores a symbolic representation of the relationships between words and phrases so that a computer can interpret rules expressed with sentences. Such symbolic descriptions lose the fine nuances of the original sentences, but we defined an encoding method that allows such loss of nuance to the extent that it has no practical effect on operation. For example, "it is better to lower the volume at an intersection" can be interpreted to mean "lower the volume at an intersection" for purposes of equipment control. If in the future it is desirable to employ more precisely nuanced expressions, it is only necessary to add a descriptive method having the desired degree of detail.

Some specific examples of symbolic descriptions written to the rule database 70 are described below with correlation to the natural language expressions.

(4-1) Description of Temporal Change
  1. Hunger increases over time:

<hunger><←+, time>

2. Fatigue increases as driving time increases:

<fatigue><←+, driving time>

3. Sleepiness increases as driving time increases:

<sleepiness><←+, driving time>

(4-2) Description of Causal Relation
  Causal relations, such as "if A, then B happens," can also be expressed by symbolic descriptions corresponding to natural language expressions.
  1. If you drink, you want to go to the toilet.:

<drink>⇒<t+; toilet>

2. Fatigue increases after playing a sport.

<sports>⇒<t+; fatigue>

3. Become sleepy as fatigue increases.

<fatigue; +>⇒<t+; sleepy>

4. Temperature drops if driving with air conditioning on.

<air conditioning>⇒<t−; temperature>

(4-3) Description of Correlations and Logical Relations
  Some examples of symbolic representations of correlations or logical relations between conditions are described below.
  If environmental conditions are not described:
  1. If hungry, then fatigue is also high <hunger><+; fatigue>

2. If fatigued, then sleepiness increases

<fatigue><+; sleepiness>

3. If continue driving, then fatigue increases

<driving time><+; fatigue>

If environmental conditions are also described, the hypothetical condition is written in the first condition <>, and the hypothetical condition is written by describing the environment with the conjunction "&" followed by the condition.
  For example, if environmental conditions are described:
  4. If the temperature is appropriate but still cold, then the user has a fever or may be hungry.

<appropriate temperature & cold>⇒<p; has fever><p; hungry> where "p" is a descriptor indicating a possibility. The present embodiment uses this descriptor to indicate probability. Probability can be indicated as shown below.

<appropriate temperature & cold>⇒<p=0.8; has fever>

<p=0.2; hungry>

5. If uncomfortable despite comfortable environment, then ill or in bad temper

<comfortable environment & uncomfortable>⇒<ill|bad temper>

(4-4) Describing Dependence on Environment
  Some conditions that depend on the environment are described below.
  1. If outside temperature is high, it's hot <temperature><+; hot>

2. On rainy days visibility is poor or it is uncomfortable

<rain><+;poor visibility><+; uncomfortable>

3. If traffic is congested, irritability rises

<congestion><+; irritation>

(4-5) Describing Related Items
  Related requests are requests that can be deduced from other requests without considering the user condition. This is based on physical constraints, such as a parking space is needed in order to leave the vehicle and do something.
  1. A parking space is needed to use the toilet <toilet><1; parking space>

2. A parking space is needed to dine

<meal><1; parking space>

3. A parking space is needed to drink

<drink><1; parking space>

It is noted that "1" here is a descriptor indicating a relation.

(4-6) Specific Descriptions

Descriptions of rules concretizing general requests are also written in the rule database 70.

1. If the user "wants to drink something," then is it coffer, tea, or juice?

<drink something><2; coffee><2; tea><2; juice> where "2" is a descriptor for a concrete option.

(4-7) Description of Cause

Conditions that become a cause for a request can be described as follows.

1. Desire to eat is due to hunger

<want to eat>⇒<hunger>

2. Desire to play is due to dissatisfaction

<want to play>⇒<dissatisfied>

3. Skiing is due to being active or healthy.

<skiing>⇒<active><healthy>

It should be noted that using symbolic descriptions such as above enables automatic conversion to a computer program. For example, the symbolic description shown in (4-2)-1 can be converted to a function description as follows.

function: if (ACT(t)="drink") then $q(t+DT)=q(t)-DQ$ endif

While functions written in the above form can be recorded in the rule database 70, symbolic descriptions such as shown above in the present embodiment are preferably used to make the functions more readable for people and more easily compilable to various computer languages.

These functions can also be written to call separately stored functions and handle changes in temporal characteristics. For example, the function shown in (4-2)-4 can be alternatively written as follows.

function: $DS=STATE(t)-STATE(t-DT)$ if (ACT="run air conditioning") then

ENV(T)=Variation (t,current temperature)

endif where Variation is a function stored separately from the rule database 70.

(5) Individual user information is also input from the interaction device 80 to the above inferring units 110, 210, 310, 410, 510, 610 to enable inferring based on the individual data.

Exemplary individual data is described below.

(5-1) Description of Individual Data

This individual data is the user profile stored in the interaction device 80. A symbolic notation similar that used with the rule database 70 can be used for this individual data. These descriptions enable to system to infer, for example, that the user is easily irritated when hungry; tends to look out the window when traffic is congested; often forgets to check the rear view mirror when turning left; and other similar characteristics descriptive of a particular user.

(5-2) Learning Individual data (Individual Characteristics)

A "hungry" condition can be relatively easily deduced from the time of day and user condition, but for the system to deduce that the user is "irritated" requires some basis (standard) for evaluation. It is, however, not unreasonable to assume as a general tendency that a user is "irritable when hungry."

The problem here is not how to deduce some general tendencies, but rather how the system can determine specific properties unique to a particular user.

To resolve this problem, the system of this invention does not determine whether to apply the rule that "when A, then B tends to occur" by asking the user "are you B." Instead, this system uses a set of physical parameters $b=(b_1, b_2, \ldots, b_n)$ characterizing that the user "is B."

The following methods can be used to determine if the user is "irritated," for example.

Method 1: Method Based on Voice Input

If the voice input from the user is "you are being noisy," for example, then there is a strong possibility that the user is irritated.

Method 2: Method Based on User Condition

Various sensors for observing the user's condition are disposed in the vehicle having the interactive system to sense the user's direction of sight, loudness of speech, respiration, sighing, hand and feet movement, and blood pressure. When values clearly different from normal values are detected, there is a strong possibility that the user is irritated.

Method 3: Method Based on Vehicle Handling (Driving)

Vehicle data such as how the steering wheel is turned, number of times the horn is sounded, change in speed, how the brakes are applied, and adjustment of the audio system volume can be detected. When values clearly different from normal values are detected, there is a strong possibility that the user is irritated.

It will be noted that methods 2 and 3 are based on sensing data from the sensors 82.

A feature of the above parameter set is that it is not particularly dependent on individual differences. Therefore if user condition B detected from such a parameter set matches the condition space, then the correlation to A can be calculated as a characteristics of the user. It is therefore possible for the system to learn that "when A, B tends to occur" based on the frequency that B is detected in condition A for a particular user.

(5-3) Inferring Based on Individual Data

User information can also be inferred using the individual data learned by the system as described above. The change in user condition can be inferred with relatively high precision by calculating the inference based on this individual data and spatial characteristics and temporal characteristics. That is, there is a greater possibility that user information can be inferred even without user input via the interaction device 80 and even if the information is incomplete. Furthermore, the accuracy of the inference can be improved in this embodiment by using periodic temporal characteristics and structural spatial characteristics for the temporal characteristics and spatial characteristics, and determining the condition path of a single user using time and space in the condition space as parameters.

(5-4) Modifying Individual Data

The reliability of the individual data can be improved if the individual data is modified based on the input data when there is user input to the interaction device 80.

(5-5) Calculating User Preferences as Individual Data

Average user preferences can be calculated by observing user requests determined by the request inferring unit 310 for a given time period. These user preferences are also written as part of the individual data.

1. User preference for requests with a low dependence on environment and circumstance, that is, requests that might be expected to occur at any time, are determined based on the frequency of occurrence. For example, preference is determined according to the average occurrence in a particular time period.

When, for example, a request for an application An of a controlled device 83 occurs at time t, the degree of request Rn(t) is 1 and otherwise is 0. Using Rn(t), frequency RTP in time period TP can be calculated using equation (53).

$$RTP=(1/TP)\Sigma Rn(t) \qquad (53)$$

where S is the sum t=t0 to (t0−TP−1). When RTP is greater than a specific evaluation RTPTH, a user preference is detected. This enables the system to learn, for example, that user A has a preference for going to park AA or that user A likes place BB.

2. Requests with a high dependency on location or condition, that is, if a request for an application An varies greatly with the value of a circumstance item $q_1$ and the repeatability of this observation is high, the calculation range of the frequency is limited and RTP is calculated in that range to determine user preference. This enables the system to learn that "user A always goes skiing in winter."

3. Preferences of multiple users, such as observed in market analyses, can be easily collected in a central computer and tabulated by sending the preferences of specific users in the form of profiles, for example, to the central computer.

(6) The undetermined values inference blocks 116, 216, 316, 416, and 616 of the inferring units 110, 210, 310, 410, 510, 610 infer incomplete or indeterminate values.

Estimating indeterminate values is described next.

Estimating indeterminate values uses the dependency characteristics described by the inventors in US Application No. (Not known) filed Jul. 3, 2001.

Indeterminate values can be inferred using past information about a particular user or other users read from the profiles stored in the interaction device 80.

Indeterminate values can also be matched with a typical vector $q_{typ}$. That is, the distance to a typical vector is calculated using equation (54) similarly to the minimize operation in condition space described above.

$$\text{minimize } d(q, q_{typ}) \qquad (54)$$

where $q_{typ}$ is a desired vector in the typical condition list TQLIST, and is the minimization in the assumed range of space and time.

The distance function d can be determined from equations (55) and (56).

$$d(q, q_{opt})=(1/SA)\Sigma a_1|q_1-q_{typ\ 1}| \qquad (55)$$

$$SA=\Sigma a_1 \qquad (56)$$

where S is the sum of i=1 to N, and condition list TQLIST is a list of typical conditions as expressed by equation (57).

$$TQLIST=[q_{t1}, q_{t2}, \ldots, q_{tM}] \qquad (57)$$

where M is the number of typical conditions.

The above distance calculation is usually sufficient if the focus is on the governing condition dimension of the typical user conditions. This can be achieved by manipulating weight coefficient $a_1$. The governing condition dimension can be defined by the user, but can also be determined automatically by the system by primary component analysis, independent component analysis (ICA), or other analysis of vector groups in the condition space.

The advantages of the user information inferring system 1 are described next below.

The user information inferring system 1 calculates the spatial characteristics and temporal characteristics, and based thereon infers user information as determined by user environment, circumstance, condition, request, and action. If the user information is known or can be inferred at a particular time, user information can be continuously inferred by calculating the temporal characteristics whereby a time element, such as the passage of time, yields an item value even if there is no user input, whether speech input or other. User information can also be continuously inferred by calculating the spatial characteristics whereby a spatial element, such as a change in location, yields an item value. Furthermore, the structural space characteristics and periodic temporal characteristics are also calculated so that the structure of spatial elements and periodicity of temporal elements are also considered. This makes it possible to more infer with greater detail based on the temporal and spatial elements user information on such varied levels as user environment, circumstance, conditions, requests, and actions.

To calculate these spatial characteristics and temporal characteristics, the system 1 introduces the concepts of a spatial expressions list shown in equation (1) and the location data lists shown in equations (2) to (4) as "spatial lists," and the temporal expressions list shown in equation (6) and the time data list shown in equation (7) as "temporal lists." These lists enable temporal elements and spatial elements to be calculated.

In addition, the temporal lists consider the time difference from GMT, and typical temporal expressions using GMT are achieved as shown in equation (8). The spatial lists also handle the similarity between the same types of structures around the world. The same configuration can thus be employed throughout the world.

Yet further, the user information inferring system 1 of this embodiment has the rule database 70, and user information can be inferred based on the rules groups recorded in the rule database 70. In addition, the rules recorded in the rule database 70 using natural language expressions are also written in a symbolic notation enabling a computer to interpret the relationship between words and phrases. This enables user information on various levels to be inferred with greater detail based on the described relationships.

As described above in (4) with specific examples, the rules in the rule database 70 can be easily constructed and appended because they are written in a specific symbolic expression. Furthermore, that the rules can be easily retrieved and understood by people, can also be interpreted by the system, and can be easily converted to various computer languages will obviously be advantageous. The rule calculation blocks 115, 215, 315, 415, and 615 analyze the rules groups of the rule database 70.

Yet further, the user information inferring system 1 expresses the user conditions inferred by the condition calculator 40 as condition vectors q and builds the condition model 430 as shown in FIG. 5. The minimization calculator block 317 of the request inferring unit 310 shown in FIG. 17 then computes the distance between this condition vector q and optimized condition vector $q_{opt}$. More specifically, the minimization calculator block 317 calculates the absolute value distance with a weight coefficient applied to each component as shown in equations (38) and (39). The request evaluation block 314 then infers the user request according to the calculated distance so as to optimize the condition vector q. That is, the user condition defined by the condition list 420 are converted to a distance, which is a physical quantity, and evaluated to infer the user requests. This makes it possible to infer appropriate requests based on the user condition. Furthermore, because the weight coefficient is applied to each component, the distance calculation is applied only to the controlling condition dimensions in the condition space.

Furthermore, the user information inferring system 1 comprises the situation calculator 60, and the situation evaluation block 614 of the situation inferring unit 610 as shown in FIG. 20 evaluates the user situation based on the user environment, circumstance, conditions, requests, and actions. By thus comprehensively expressing the user information, the nature of the user information can be determined. That is, the system 1 can more accurately understand the user information.

The deduced situation is then encoded by the encoding block 618 and output to the interaction device 80. The interaction device 80 can then decode the situation code, thus minimizing the risk for invasion of privacy while still enabling equipment to be operated. The situation code can be stored in a smart card or other storage devices, and transmitted via a communications path, remote control output, or other means.

Yet further, the inferring units 110, 210, 310, 410, 510 calculate the spatial characteristics and temporal characteristics based on the previously inferred situation data, and then infer the user information. At this time, the priority determination blocks 113 to 413 determine the priority of the items in the situation data set according to the user information being inferred. Therefore, appropriate inference calculations can be achieved using the item values of the situation data set according to the defined order of priority.

Furthermore, the component decomposition block 619 decomposes the deduced situation into the user environment, circumstance, condition, request, and action components, and user information is then inferred based on the decomposed results. By using the situation data in this way, the system 1 can infer detailed user information.

Yet further, the user information inferring system 1 expresses such user information as the user environment, circumstance, conditions, requests, and actions using an environment list 120, circumstance list 220, request list 320, conditions list 420, action list 520, and situation list 620 with lists arranged in a hierarchy based on how much the items in the lists are used.

Furthermore, the user information inferring system 1 also infers user information based on externally input individual data. It is therefore possible to infer appropriate information according to the particular user.

Yet further, the user information inferring system 1 estimates incomplete or indeterminate values after inferring the user information. More specifically, the distance to a typical vector is calculated as shown in equations (54) to (56). It is therefore possible to prevent incomplete or indeterminate values being used for items that are actively used, and item values can therefore be more reliably determined.

By thus inferring user information in greater detail and more accurately, the interaction device 80 can appropriately operate a controlled device 83 or other equipment as follows.

A detailed site required for a content search can be automatically selected.

The required application or equipment can be automatically inferred, thus customizing the system without bothering the user.

The voice recognition dictionary can be optimized by observing how the user speaks. The recognition rate can thus be improved.

Interactive planning with consideration for the user condition is possible, making interaction via speech easier.

The on-screen interface can be dynamically optimized.

By recording the user history in condition space, the system can learn the correlation between circumstance, conditions, and requests, thereby improving the ability to infer the appropriate request the next time a similar condition occurs.

By having plural users inhabit the model space {environment, circumstance, conditions, requests, and actions}, standard features generally typical of any user without being dependent on user preferences can be learned.

It should be noted that the environment evaluation blocks 114, 214, 314, 414, and 614 of the inferring units 110, 210, 310, 410, 510, and 610 perform inferring function, and the spatial characteristics calculation blocks 111, 211, 311, 411, and 611 and temporal characteristics calculation blocks 112, 212, 312, 412, and 612 perform a characteristics calculating function. In addition, the minimization calculator block 317 of the request inferring unit 310 in FIG. 17 performs a distance calculating function.

Furthermore, the encoding block 618 of the situation inferring unit 610 shown in FIG. 20 performs an encoding function, the priority determination blocks 113, 213, 313, 413 of the inferring units 110, 210, 310, 410 perform a priority determination function, and the undetermined values inference blocks 116, 216, 316, 416, 616 perform an undetermined values inference function.

It is to be noted that various changes and modifications will be apparent to those skilled in the art. Such changes and modifications are to be understood as included within the scope of the present invention as defined by the appended claims, unless they depart therefrom.

For example, the request inferring unit 310 may alternatively define environment vectors and circumstance vectors, optimize these vectors, and thereby infer user information. Furthermore, the user information inferring system 1 may alternatively construct the individual data.

What is claimed is:

1. A computer-assisted user information inferring system for a vehicle occupied by a user, comprising:

inputting means for inputting various data, including data input by the user;

a processor cooperatively operable with the inputting means, the processor being configured to facilitate, responsive to the various data, inferring information representative of the user; storing the information as at least one item in at least one data set of a plurality of data sets, by defining the information as corresponding to the at least one data set, the at least one data set including a plurality of data lists including a first data list and at least one second data list, a data list including a plurality of items including the at least one item, wherein the items in the at least one second data list are a subset of the items in the first data list, and expressing the information as the at least one item written in at least one data list included in the at least one data set; changing values for at least a part of the items in each data set, responsive to temporal-spatial elements; wherein the inferring further includes determining the information responsive to items of the data sets other than the at least one data set; calculating at least one of a temporal characteristic that a temporal element imparts to a value of the at least one item and a spatial characteristic that a spatial element imparts to the value; and generating an output representative of the value;

output means for using the value, responsive to the output, in the vehicle used by the user.

2. The user information inferring system as in claim 1, wherein:
calculating further includes determining a periodic temporal characteristic indicative of periodicity of the temporal element.

3. The user information inferring system as in claim 1, wherein:
calculating further includes determining the temporal characteristic using a time list of temporal expressions.

4. The user information inferring system as in claim 3, wherein:
the time list describes in addition to the temporal expressions a time difference from a reference time; and
calculating further includes determining the temporal characteristic with reference to the time difference.

5. The user information inferring system as in claim 3, wherein:
the time list includes a time data list in which the temporal expressions or the temporal expressions and time difference are expressed as variables.

6. The user information inferring system as in claim 1, wherein:
calculating further includes determining a structural space characteristic indicative of structure of the spatial element.

7. The user information inferring system as in claim 1, wherein:
calculating further includes determining the spatial characteristic using a spatial list describing a reference facility and neighboring facilities.

8. The user information inferring system as in claim 7, wherein:
the spatial list includes a location data list indicating a facility location using a vector variable from the reference facility.

9. The user information inferring system as in claim 1, further comprising:
a rule database, in a memory, storing rules correlating items written in the at least one data list for the at least one data set,
wherein the inferring further includes inferring the information based on the rules stored in the rule database, which are responsive to items of the data sets other than the at least one data set.

10. The user information inferring system as in claim 1, wherein the at least one data set is expressed by a data vector for each data set using the value of the at least one item as a component,
wherein the processor is further configured to calculate a distance between the data vector and a reference vector indicating target condition for the at least one data set, and
wherein the inferring means infers the information to correspond to the at least one data set based on the distance.

11. The user information inferring system as in claim 1, wherein:
the plurality of data lists are hierarchically arranged according to the usage of the items; and
the inferring preferentially infers the information for the item written in the data list with a high usage ranking.

12. The user information inferring system as in claim 1, wherein:
the inferring infers the information based on individual data indicative of user characteristics.

13. The user information inferring system as in claim 1, the processor being further configured to facilitate inferring an incomplete or indeterminate item value from other elements after the inferring infers the information.

14. The user information inferring system as in claim 1, wherein:
the inputting means includes a user input device for inputting the user input data responsive to the user, and other input devices for inputting other data indicative of vehicle surroundings independently of an operation of the user input device by the user; and
the outputting means includes equipment mounted in the vehicle and operated by the user.

15. The user information inferring system as in claim 1, wherein:
the various data include current user position and initial vehicle interior environment values.

16. The user information inferring system as in claim 1, wherein respective data sets are related to information selected from respective ones of: environment, circumstance, request, condition, situation, and action.

17. A computer-assisted user information inferring system for a vehicle occupied by a user, comprising:
inputting means for inputting various data, including data input by the user;
a processor cooperatively operable with the inputting means, the processor being configured to facilitate, responsive to the various data, inferring information representative of the user; storing the information as at least one item in at least one data set of a plurality of data sets, by defining the information as corresponding to the at least one data set, the at least one data set including a plurality of data lists including a first data list and at least one second data list, a data list including a plurality of items including the at least one item, wherein the items in the at least one second data list are a subset of the items in the first data list, and expressing the information as the at least one item written in at least one data list included in the at least one data set; changing values for at least a part of the items in each data set, responsive to temporal-spatial elements; wherein the inferring further includes determining the information responsive to items of the data sets other than the at least one data set;
a rule database, in a memory, storing rules correlating items written in the at least one data list for the at least one data set,
wherein the inferring further includes inferring the information based on the rules stored in the rule database, which are responsive to items of the data sets other than the at least one data set; and
output means for using a value of the at least one item, responsive to the output, in the vehicle used by user.

18. The user information inferring system as in claim 17, wherein the processor is further configured to facilitate analytically calculating rules, the rules being written in symbolic notation in the rule database, and the at least one item being stored as a natural language expression.

19. The user information inferring system as in claim 18, wherein:
the calculating converts the symbolic notations to a specific programming language.

20. The user information inferring system as in claim 17, wherein:
the rule database stores rules for changing the values due to temporal and spatial elements.

21. The user information inferring system as in claim 17, wherein:
the rule database stores rules for changing the value of the at least one item due to compatibility and causal relation between the values.

22. The user information inferring system as in claim 17, wherein:
the rules include a rule for changing the item value expressed as a probability in the rule database.

23. The user information inferring system as in claim 17, wherein:
the rule database stores a rule for concretizing the item.

24. The user information inferring system as in claim 17, wherein the at least one data set is expressed by a data vector using the value of the at least one item therein as a component, wherein the processor is further configured to facilitate calculating a distance between the data vector and a reference vector indicating a target condition for the at least one data set, and
wherein the inferring infers the information to correspond to the at least one data set based on the distance.

25. The user information inferring system as in claim 17, wherein:
the at least one data set includes a situation data set indicating a user situation; and
the inferring infers an item value of the situation data set based on item values of other data sets.

26. The user information inferring system as in claim 17, wherein:
the plurality of data lists are hierarchically arranged according to the usage of the items; and
the inferring preferentially infers the information for the item written in the data list with a high usage ranking.

27. The user information inferring system as in claim 17, wherein:
the inferring infers the information based on individual data indicative of user characteristics.

28. The user information inferring system as in claim 17, wherein the processor is further configured to facilitate inferring an incomplete or indeterminate item value from other elements after the inferring infers the information.

29. The user information inferring system as in claim 17, wherein:
the inputting means includes a user input device for inputting the user input data responsive to the user, and other input devices for inputting other data indicative of vehicle surroundings independently of an operation of the user input device by the user; and
the outputting means includes equipment mounted in the vehicle and operated by the user.

30. The user information inferring system as in claim 17, wherein:
the various data include current user position and initial vehicle interior environment values.

31. The user information inferring system as in claim 17, wherein respective data sets are related to information selected from respective ones of: environment, circumstance, request, condition, situation and action.

32. A computer-assisted user information inferring system for a vehicle occupied by a user, comprising:
inputting means for inputting various data, including data input by the user;
a processor cooperatively operable with the inputting means, the processor being configured to facilitate, responsive to the various data, inferring information representative of the user; storing the information as at least one item in at least one data set of a plurality of data sets, by defining the user information as corresponding to the at least one data set, the at least one data set including a plurality of data lists including a first data list and at least one second data list, a data list including a plurality of items including the at least one item, wherein the items in the at least one second data list are a subset of the items in the first data list, the data lists being expressed by a data vector for each data list using a value of the at least one item as a component, and expressing the information as the at least one item written in at least one data list included in the at least one data set; changing values for at least a part of the items in each data set, responsive to temporal-spatial elements; wherein the inferring further includes determining the information responsive to items of the data sets other than the at least one data set; calculating a distance between the data vector and a reference vector indicating a target condition for the at least one data set wherein the inferring infers the information to correspond to the at least one data set based on the distance; and generating an output representative of the item;
output means for using a value of the at least one item, responsive to the output, in the vehicle used by the user.

33. The user information inferring system as in claim 32, wherein:
the value of the at least one item is a numeric value in a specific range of which a target value is one of 0, a minimum value and a maximum value.

34. The user information inferring system as in claim 32, wherein:
the calculating calculates the distance with consideration for the importance of each component of at least one of the data vector and the reference vector.

35. The user information inferring system as in claim 34, wherein:
the calculating calculates the distance with reference to importance of each component by giving a specific component priority with respect to another component.

36. The user information inferring system as in claim 34, wherein:
the calculating calculates the distance with reference to importance of each component by weighting each component.

37. The user information inferring system as in claim 32, wherein:
the at least one data set includes a situation data set indicating a user situation.

38. The user information inferring system as in claim 32, wherein:
the plurality of data lists are hierarchically arranged according to the usage of the items; and
the inferring preferentially infers the information for the item written in the data list with a high usage ranking.

39. The user information inferring system as in claim 32, wherein:
the inferring infers the information based on individual data indicative of user characteristics.

40. The user information inferring system as in claim 32, wherein the processor is further configured to facilitate inferring an incomplete or indeterminate item value from other elements after the inferring means infers the information.

41. The user information inferring system as in claim 32, wherein:
the inputting means includes a user input device for inputting the user input data responsive to the user, and other input devices for inputting other data indicative of vehicle surroundings independently of an operation of the user input device by the user; and the outputting means includes equipment mounted in the vehicle and operated by the user.

42. The user information inferring system as in claim 32, wherein:
the various data include current user position and initial vehicle interior environment values.

43. The user information inferring system as in claim 32, wherein respective data sets are related to information selected from respective ones of: environment, circumstance, request, condition, situation, and action.

44. A computer-assisted user information inferring system for a vehicle occupied by a user, comprising:
inputting means for inputting various data, including data input by the user;
a processor cooperatively operable with the inputting means, the processor being configured to facilitate, responsive to the various data, inferring information representative of the user; storing the information as at least one item in at least one data set of a plurality of data sets, by defining the user information as corresponding to the at least one data set, the at least one data set including a plurality of data lists including a first data list and at least one second data list, a data list including a plurality of items including the at least one item, wherein the items in the at least one second data list are a subset of the items in the first data list, and expressing the information as the at least one item written in at least one data list included in the at least one data set; changing values for at least a part of the items in each data set, responsive to temporal-spatial elements; wherein the at least one data set is a situation data set indicating a user situation, and the inferring further includes determining the information responsive to items of the data sets other than the at least one data set; and generating an output representative of the item;
output means for using a value of the at least one item, responsive to the output, in the vehicle used by the user.

45. The user information inferring system as in claim 44, wherein:
the other data sets categorically define user environment, circumstance, condition, request, and action.

46. The user information inferring system as in claim 44, wherein the processor is further configured to facilitate encoding item values of the situation data set as a situation code.

47. The user information inferring system as in claim 44, wherein:
the inferring infers item values of other data sets based on the item value of a situation data set evaluated previously.

48. The user information inferring system as in claim 44, wherein:
the inferring decomposes a situation data set evaluated previously to infer an item value of at least one of the other data sets.

49. The user information inferring system as in claim 44, wherein the processor is further configured to facilitate calculating at least one of temporal characteristics and spatial characteristics based on the item values of a situation data set evaluated previously.

50. The user information inferring system as in claim 44, wherein the processor is configured to facilitate determining priority of the item value in the situation data set according to the inferred data set; and
infers using the item value of the situation data set according to a priority sequence determined by the priority.

51. The user information inferring system as in claim 44, wherein:
the plurality of data lists are hierarchically arranged according to the usage of the items therein; and
the inferring preferentially infers the item value for the item written in the data list with a high usage ranking.

52. The user information inferring system as in claim 51, wherein:
the first data list is a complete list of all items, and the second data is list an active list of most frequently used items.

53. The user information inferring system as in claim 51, wherein:
the inferring changes the hierarchy of items in the data list based on the inferred item value.

54. The user information inferring system as in claim 44, wherein:
the inferring infers the item value based on individual data indicative of user characteristics.

55. The user information inferring system as in claim 54, wherein:
the individual data includes user preference information.

56. The user information inferring system as in claim 54, wherein:
the user preference information is determined based on user requests determined from the item value in addition to or substitutionally for the sensor data.

57. The user information inferring system as in claim 54, wherein the processor is further configured to facilitate constructing individual data.

58. The user information inferring system as in claim 57, wherein:
the constructing constructs the individual data by inference responsive to sensor data.

59. The user information inferring system as in claim 44, wherein the processor is further configured to facilitate inferring an incomplete or indeterminate item value from other elements after inferring means the information.

60. The user information inferring system as in claim 59, wherein:
the at least one data set is expressed with a data vector,
wherein processor is further configured to facilitate calculating a distance to a typical data vector to infer the incomplete or indeterminate item value.

61. The user information inferring system as in claim 44, wherein:
the inputting means includes a user input device for inputting the user input data responsive to the user, and other input devices for inputting other data indicative of vehicle surroundings independently of an operation of the user input device by the user; and
the outputting means includes equipment mounted in the vehicle and used by the user.

62. The user infomiation inferring system as in claim 44, wherein:
the various data include current user position and initial vehicle interior environment values.

63. A computer-readable medium comprising instructions being executed by a computer, the instructions including a computer-implemented method for inferring user information for a vehicle, the instructions for implementing the steps of:
inputting first data responsive to a user; and inputting, from a vehicle, second data indicative of vehicle surroundings of the user;

inferring, from at least one of the first data and the second data, user information, which is information relating to the user; storing the information as at least one item in at least one data set of a plurality of data sets, by defining the user information as corresponding to the at least one data set, wherein the data set includes a plurality of data lists including a first data list and at least one second data list, a data list including a plurality of items including the at least one item, wherein the items in the at least one second data list are a subset of the items in the first data list, and expressing the information as the at least one item written in at least one data list included in the at least one data set; wherein the inferring further includes determining the information responsive to items of the data sets other than the at least one data set; changing values for at least a part of the item values in each data set changes responsive to temporal-spatial elements;

calculating at least one of a temporal characteristic that a temporal element imparts to a value of the at least one item and a spatial characteristic that a spatial element imparts to the value;

calculating a distance between items represented in data lists to determine a target condition for the at least one data set based on the distance;

wherein the inferring instructions infer the information responsive to the at least one characteristic calculated by the calculating instructions; and outputting the value in the vehicle used by the user.

64. The user information inferring system as in claim 63, wherein:

the second data include current user position and initial vehicle interior environment values.

* * * * *